(12) United States Patent
Nakata et al.

(10) Patent No.: US 9,775,127 B2
(45) Date of Patent: Sep. 26, 2017

(54) RADIO COMMUNICATION SYSTEM, RADIO COMMUNICATION METHOD, BASE CONTROL STATION, AND RELAY APPARATUS

(71) Applicant: NEC Corporation, Tokyo (JP)

(72) Inventors: Atsushi Nakata, Tokyo (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/032,857

(22) PCT Filed: Aug. 11, 2014

(86) PCT No.: PCT/JP2014/004168
§ 371 (c)(1),
(2) Date: Apr. 28, 2016

(87) PCT Pub. No.: WO2015/063984
PCT Pub. Date: May 7, 2015

(65) Prior Publication Data
US 2016/0270024 A1    Sep. 15, 2016

(30) Foreign Application Priority Data
Oct. 31, 2013  (JP) .................................. 2013-226184

(51) Int. Cl.
*H04W 24/00*     (2009.01)
*H04W 64/00*     (2009.01)
(Continued)

(52) U.S. Cl.
CPC ........... *H04W 64/003* (2013.01); *H04W 8/22* (2013.01); *H04W 84/00* (2013.01);
(Continued)

(58) Field of Classification Search
CPC ..... H04W 64/003; H04W 8/22; H04W 64/00; H04W 84/045; H04W 92/12;
(Continued)

(56) References Cited

U.S. PATENT DOCUMENTS 7,304,976 B2 * 12/2007 Mao ....................... 340/870.11
7,764,185 B1 * 7/2010 Manz .................. G08B 27/005
340/3.1
(Continued)

FOREIGN PATENT DOCUMENTS

EP      2 654 339 A1    10/2013
JP      2009111760 A  *  5/2009
(Continued)

OTHER PUBLICATIONS

International Search Report corresponding to PCT/JP2014/004168, dated Oct. 28, 2014 (5 pages).
(Continued)

*Primary Examiner* — Mahendra Patel
(74) *Attorney, Agent, or Firm* — Wilmer Cutler Pickering Hale and Dorr LLP

(57) ABSTRACT

A radio communication system includes a relay apparatus (30) connected between a base station (40) and a base control station (20) and a location information control station (10), in which: the location information control station (10) includes: a request generation unit (11) for generating a location information request including regional information of a region for which the location information is requested; and a request transmission unit (12) for transmitting the location information request that has been generated to the base control station (20), and the base control station (20) includes: a request reception unit (21) for receiving the location information request transmitted from the location information control station (10); and a request transmission
(Continued)

unit (22) for transmitting the location information request including the regional information in the location information request that has been received to the relay apparatus (30). It is therefore possible to accurately transmit the location information request.

12 Claims, 14 Drawing Sheets

(51) Int. Cl.
  *H04W 92/12* (2009.01)
  *H04W 84/00* (2009.01)
  *H04W 84/04* (2009.01)
  *H04W 8/22* (2009.01)
  *H04W 88/08* (2009.01)

(52) U.S. Cl.
  CPC ......... *H04W 84/045* (2013.01); *H04W 92/12* (2013.01); *H04W 88/08* (2013.01)

(58) Field of Classification Search
  CPC ..... H04W 88/08; H04W 28/02; H04W 24/10; H04W 4/02; H04B 7/2606; H04B 17/18; G08G 1/0104; G08G 1/056
  USPC ................ 455/456.2, 422.1, 456.1; 370/331
  See application file for complete search history.

(56) References Cited

U.S. PATENT DOCUMENTS

| | | | | |
|---|---|---|---|---|
| 8,064,378 B2* | 11/2011 | Karabinis | .......... | H04B 7/18513 370/312 |
| 8,258,943 B2* | 9/2012 | Park | ................ | H04L 12/2825 340/10.1 |
| 8,423,768 B2* | 4/2013 | Huang | ................ | G06F 21/33 713/168 |
| 8,477,790 B2* | 7/2013 | Shin | .............. | H04B 7/155 370/400 |
| 8,483,157 B2* | 7/2013 | Moon | ................ | H04L 1/004 370/329 |
| 2003/0073403 A1* | 4/2003 | Miyazaki | ........... | H04B 7/155 455/7 |
| 2007/0206500 A1* | 9/2007 | Mollah | ............. | H04B 7/2606 370/235 |
| 2009/0233574 A1* | 9/2009 | Shinozaki | .......... | G01S 5/0263 455/404.2 |
| 2010/0027455 A1* | 2/2010 | Wang | ................ | H04W 72/005 370/312 |
| 2010/0030465 A1* | 2/2010 | Solkesz | ............. | G01C 21/20 701/533 |
| 2010/0120442 A1* | 5/2010 | Zhuang | ........... | H04B 7/15507 455/450 |
| 2011/0050461 A1* | 3/2011 | Pixley | ............. | G08G 1/0104 340/933 |
| 2011/0237255 A1* | 9/2011 | Furukawa | .......... | H04B 7/15535 455/436 |
| 2012/0140702 A1* | 6/2012 | Takano | ............ | H04B 7/2606 370/315 |
| 2012/0142313 A1* | 6/2012 | Edge | ................... | H04W 64/003 455/410 |
| 2012/0252471 A1* | 10/2012 | Futaki | ................. | G01S 5/0018 455/450 |
| 2013/0267238 A1* | 10/2013 | Hapsari | ................ | H04W 24/10 455/450 |

FOREIGN PATENT DOCUMENTS

| | | | |
|---|---|---|---|
| JP | 2012-044286 A | 3/2012 | |
| JP | 2012-129641 A | 7/2012 | |
| KR | 20080066258 A * | 7/2008 | .......... H04B 7/2606 |
| WO | WO-2012/075278 A1 | 6/2012 | |
| WO | WO-2012/132340 A1 | 10/2012 | |

OTHER PUBLICATIONS

3GPP TSG-RAN WG3#69, R3-102434, NTT Docomo, Inc., Qualcomm Incorporated, Telecom Italia "LCS Function for HeNB," Aug. 23-27, 2010 (7 pages).
3GPP TS 23.271 V11.2.0 (Mar. 2013) Technical Specification; 3rd Generation Partnership Project; Technical Specification Group Services and System Aspects; Functional Stage 2 Description of Location Services (LCS) (Release 11) (169 pages).
3GPP TS 29.171 V11.3.0 (Jun. 2013) Technical Specification 3rd Generation Partnership Project; Technical Specification Group Core Network and Terminals; Location Services (LCS); LCS Application Protocol (LCS-AP) Between the Mobile Management Entity (MME) and Evolved Serving Mobile Location Centre (E-SMLC); SLs interface (Release 11) (51 pages).
3GPP TS 36.413 V11.4.0 (Jun. 2013) Technical Specification 3rd Generation Partnership Project; Technical Specification Group Radio Access Network; Evolved Universal Terrestrial Radio Access Network (E-UTRAN); S1 Application Protocol (S1AP) (Release 11) (274 pages).
3GPP TS 36.455 V11.3.0 (Jun. 2013) Technical Specification 3rd Generation Partnership Project; Technical Specification Group Radio Access Network; Evolved Universal Terrestrial Radio Access (E-UTRA); LTE Positioning Protocol A (LPPa) (Release 11) (60 pages).
3GPP TS 36.300 V11.6.0 (Jun. 2013) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (209 pages).
3GPP TR 36.842 V0.2.0 (May 2013) Technical Report 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12) (38 pages).
Japanese Notification of Reasons for Refusal issued by the Japan Patent Office for Japanese Application No. 2015-544767 dated Mar. 21, 2017 (8 pages).
Qualcomm Incorporated, "Positioning support with HeNBs," 3GPP TSG-RAN WG3, #66bis, R3-100342, Agenda Item 16, Valencia, Spain, 3 pages (Jan. 18-22, 2010).

\* cited by examiner

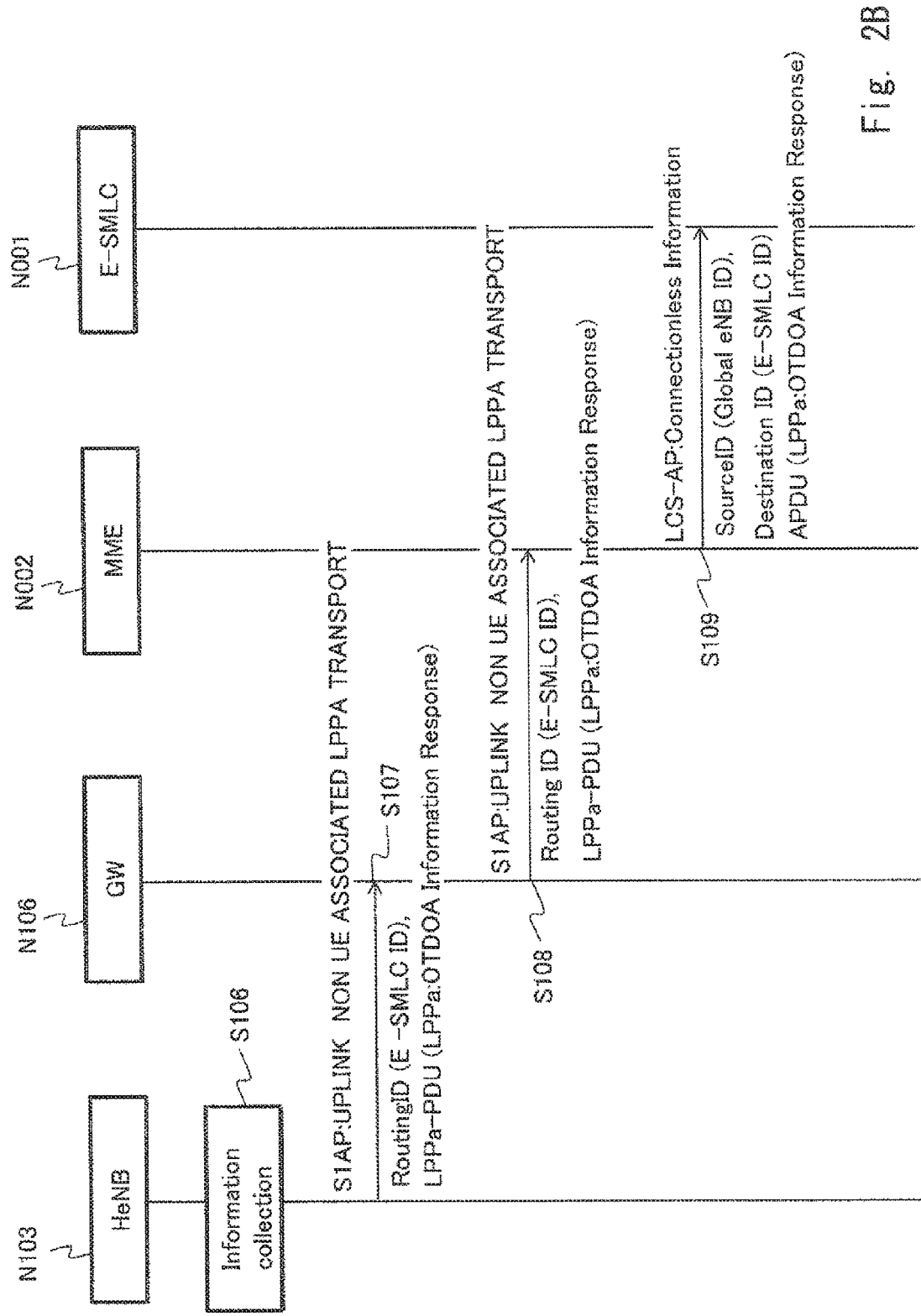

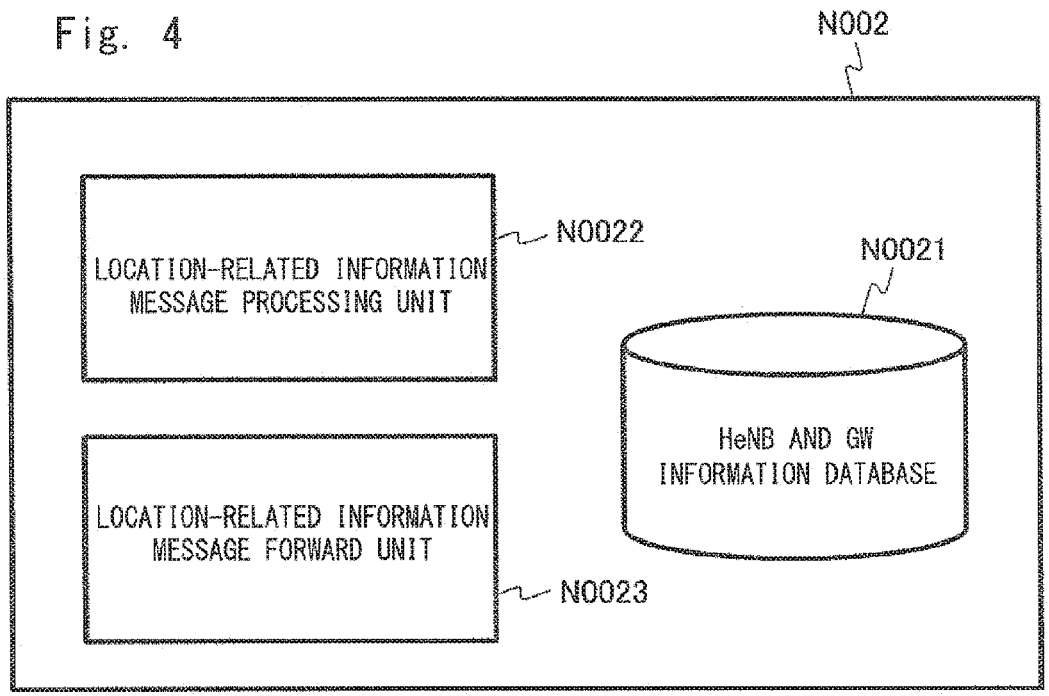
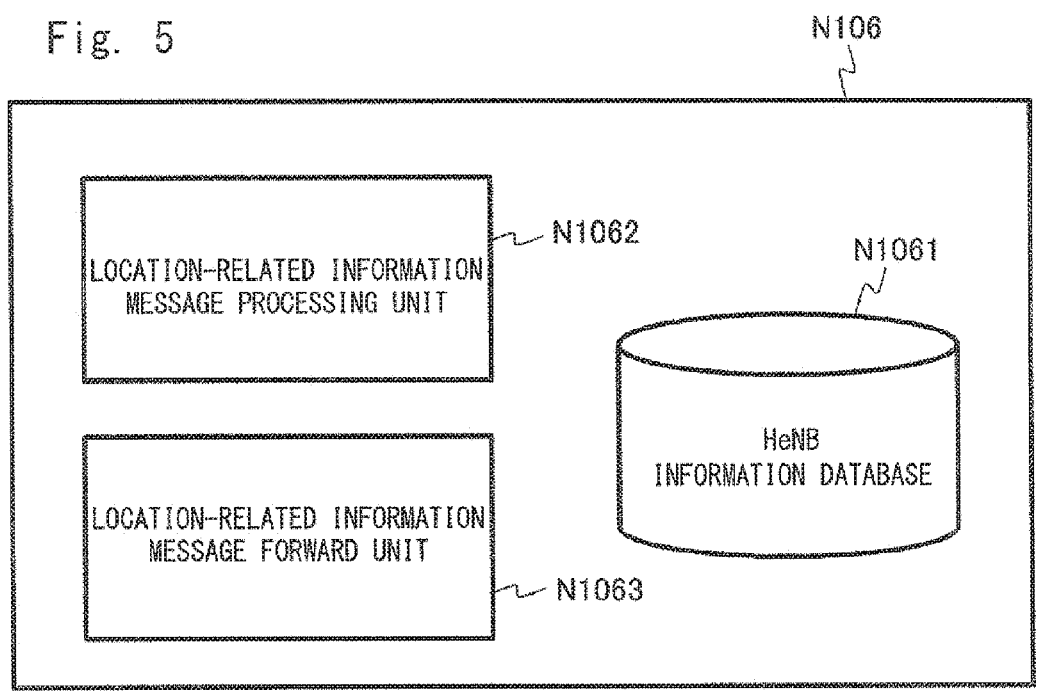

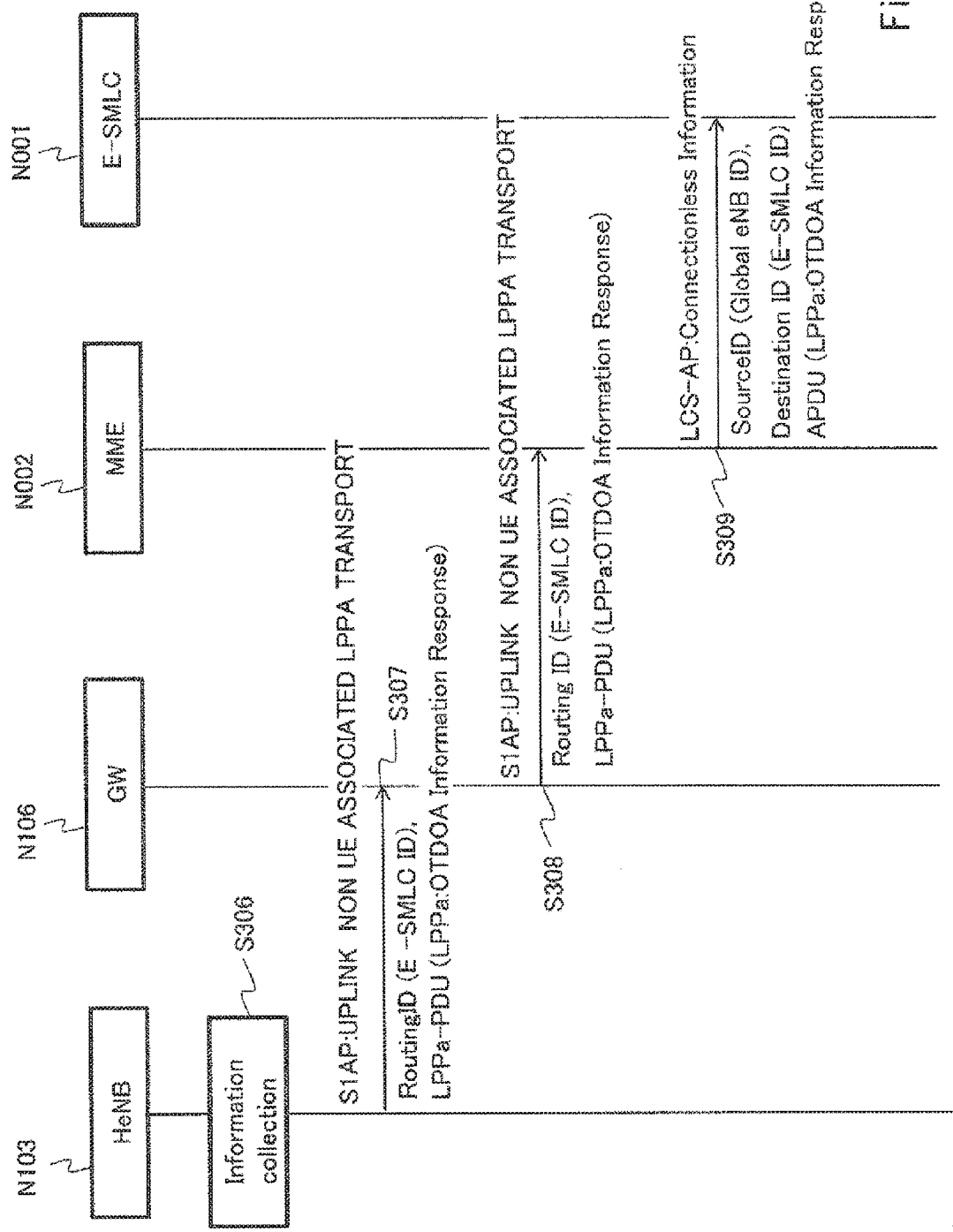

RADIO COMMUNICATION SYSTEM, RADIO COMMUNICATION METHOD, BASE CONTROL STATION, AND RELAY APPARATUS

CROSS-REFERENCE TO RELATED APPLICATIONS

This application is a national stage application of International Application No. PCT/JP2014/004168 entitled "Radio Communication System, Radio Communication Method, Base Control Station, and Relay Apparatus," filed on Aug. 11, 2014, which claims priority to Japanese Patent Application No. 2013-226184, filed on Oct. 31, 2013. The disclosures of each which are hereby incorporated by reference in their entirety.

TECHNICAL FIELD

The present invention relates to a radio communication system, a radio communication method, a base control station, and a relay apparatus, and more particularly, to a radio communication system, a radio communication method, a base control station, and a relay apparatus including a location information control station.

BACKGROUND ART

In a Long Term Evolution (LTE) system, which is a radio communication system, a location management center (Enhanced Serving Mobile Location Centre: hereinafter it will be referred to as an E-SMLC), an LTE base control station (Mobility Management Entity: hereinafter it will be referred to as an MME), and an LTE base station (enhanced Node B: hereinafter it will be referred to as an eNB) transmit and receive a location information control message in order to manage location information of a communication terminal (User Equipment: hereinafter it will be referred to as a UE). The eNB includes a small radio base station (Home enhanced Node B: hereinafter it will be referred to as an HeNB).

In the location information control message, there is a location information collection message of the UE and a location-related information collection message of an eNB required to specify the location information of the UE. This specification is mainly related to the location-related information collection message of the eNB.

FIG. 12 shows a network configuration (network architecture) in a location control method of an LTE system according to related art.

As shown in FIG. 12, the LTE system according to the related art includes a UE (N905), a radio base station eNB (N903), a cell (N904) formed of the eNB (N903), an MME (N902) that executes in-network mobility management of the UE (N905), and an E-SMLC (N901) that manages and calculates the location information of the UE (N905) and the eNB (N903). The UE (N905) is located within the cell (N904) and is connected to the eNB (N903). The roles of the respective nodes are disclosed in Non-Patent Literature 1 and 5.

FIG. 13 shows a message sequence according to transmission and reception of a location-related information collection message of the eNB in the location control method of the LTE system according to related art.

In S001, the E-SMLC (N901) transmits an LCS-AP: Connectionless Information message to obtain the location information of the eNB (N903). The details of this message are disclosed in Non-Patent Literature 2. According to the disclosure in Non-Patent Literature 2, a Source Identity, a Destination Identity, and an APDU are set in this message. The Source Identity is an E-SMLC Identity that specifies the E-SMLC, the Destination Identity is a Global eNB Identity that specifies the eNB, and the APDU includes information indicating which kind of information of the eNB is required.

The details of information included in the APDU in the LCS-AP: Connectionless Information message are disclosed in Non-Patent Literature 4. According to Non-Patent Literature 4, one example of the information included in the APDU in the LCS-AP: Connectionless Information message is an LPPa: OTDOA Information Request, which is one information acquisition request of the eNB among location-related information collection messages.

The LPPa: OTDOA Information Request message includes an LPPa Transaction ID and an OTDOA Information Item. The LPPa Transaction ID indicates an ID that specifies one information collection and acquisition process and the OTDOA Information Item includes an information item of the eNB that the E-SMLC requires (e.g. pci, cellid, tac, earfcn, prsBandwidth, prsConfigIndex, cpLength, noDlFrames, noAntennaPorts, sFNInitTime, . . . , e-UTRANAccessPointPosition, prsmutingconfiguration). Since each item is typical information as the location-related information of the LTE system and the eNB, the details thereof will be omitted.

In S002, the MME (N902) determines the eNB to which the location-related control message will be transmitted according to the configuration of the Global eNB ID of the Destination Identity included in the LCS-AP: Connectionless Information message received from the E-SMLC in S001.

In S003, the MME (N902) transmits an S1AP: DOWNLINK NON UE ASSOCIATED LPPA TRANSPORT message to the eNB determined in S002. The details of this message are disclosed in Non-Patent Literature 3. According to Non-Patent Literature 3, this message includes a Routing ID and an LPPa-PDU, the Routing ID has a desired value from 0 to 255, and the E-SMLC Identity may be set in this message. The LPPa-PDU includes the APDU included in the LCS-AP: Connectionless Information message received from the E-SMLC in S001. Specific examples of the LPPa-PDU include an LPPa: OTDOA Information Request.

In S004, the eNB (N903) collects the location-related information of the eNB (N903) according to the OTDOA Information Item included in the OTDOA Information Request received in S003.

In S005, the eNB (N903) transmits an S1AP: UPLINK NON UE ASSOCIATED LPPA TRANSPORT message to the MME (N902). The details of this message are disclosed in Non-Patent Literature 3. According to Non-Patent Literature 3, this message includes a Routing ID and an LPPa-PDU. The Routing ID sets a value the same as the S1AP: DOWNLINK NON UE ASSOCIATED LPPA TRANSPORT message received in S003 and the LPPa-PDU includes eNB location-related information.

The details of the information included in the LPPa-PDU in the S1AP: UPLINK NON UE ASSOCIATED LPPA TRANSPORT message are disclosed in Non-Patent Literature 4. According to Non-Patent Literature 4, the information included in the LPPa-PDU in the S1AP: UPLINK NON UE ASSOCIATED LPPA TRANSPORT message corresponds to an LPPa: OTDOA Information Response, which is one response message of the eNB. The LPPa: OTDOA Information Response message includes the LPPa Transaction ID and the OTDOA Cell Information for the number of cells that the eNB forms. The LPPa Transaction ID is the same as the value set in the LPPa: OTDOA Information Request message included in the S1AP: DOWNLINK NON UE ASSOCIATED LPPA TRANSPORT message received in S003. The OTDOA Cell Information is set in the LPPa: OTDOA Information Request message included in the S1AP: DOWNLINK NON UE ASSOCIATED LPPA TRANSPORT message received in S003. The eNB location-related information related to the OTDOA Information Item is set as the OTDOA Cell Information. According to Non-Patent Literature 4, the OTDOA Cell Information is able to set 256 cells at maximum.

In S006, the MME (N902) transmits an LCS-AP: Connectionless Information message corresponding to the LPPa-PDU and the Routing ID included in the S1AP: UPLINK NON UE ASSOCIATED LPPA TRANSPORT message received in S005 to the E-SMLC (N901). As described above, the Source Identity, the Destination Identity, and the APDU are set in this message. The Source Identity sets the Global eNB Identity that specifies the eNB, the Destination Identity sets the E-SMLC Identity that specifies the E-SMLC, and the APDU sets the LPPa-PDU included in the S1AP: UPLINK NON UE ASSOCIATED LPPA TRANSPORT message received in S005. The MME (N902) may manage S003 and S005 in association with S001, construct the message in S006, and transmit the message to the E-SMLC (N901), or may set the information of the eNB that has transmitted the message in S005 and the Routing ID included in S005 as the Source Identity and the Destination Identity of the LCS-AP: Connectionless Information message in S006.

After that, the E-SMLC (N901) stores the information of the eNB (N903) that has been acquired as information necessary for specifying the location information of the UE (N905). By performing a calculation using the information acquired from the UE and the location-related information of the eNB acquired from the eNB, the E-SMLC is able to calculate highly accurate UE location information. The details thereof will be omitted since they do not have a direct relationship with the present specification.

While S001 to S006 indicate transmission and reception of the location information collection message defined in Non-Patent Literature 1, this procedure can be achieved only by the configuration shown in FIG. 12.

CITATION LIST

Non Patent Literature

[Non-Patent Literature 1] 3GPP TS 23.271 V11.2.0 (2013-03) Technical Specification 3rd Generation Partnership Project; Technical Specification Group Services and System Aspects; Functional stage 2 description of Location Services (LCS) (Release 11)
[Non-Patent Literature 2] 3GPP TS 29.171 V11.3.0 (2013-06) Technical Specification 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 11)
[Non-Patent Literature 3] 3GPP TS 36.413 V11.4.0 (2013-06) Technical Specification 3rd Generation Partnership Project; Technical Specification Group Radio Access Network; Evolved Universal Terrestrial Radio Access Network (E-UTRAN); S1 Application Protocol (S1AP) (Release 11)
[Non-Patent Literature 4] 3GPP TS 36.455 V11.3.0 (2013-06) Technical Specification 3rd Generation Partnership Project; Technical Specification Group Radio Access Network; Evolved Universal Terrestrial Radio Access (E-UTRA); LTE Positioning Protocol A (LPPa) (Release 11)
[Non-Patent Literature 5] 3GPP TS 36.300 V11.6.0 (2013-06) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)
[Non-Patent Literature 6] 3GPP TR 36.842 V0.2.0 (2013-05) Technical Report 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)

Patent Literature

[Patent Literature] Japanese Unexamined Patent Application Publication No. 2012-44286

SUMMARY OF INVENTION

Technical Problem

In addition to the configuration of the LTE system according to related art as shown in FIG. 12, there is a case in which a Home eNB Gateway (hereinafter it will be referred to as an HeNBGW or a GW) is included between the MME and the HeNB.

When a plurality of HeNBs are connected to the GW in such a way that the plurality of HeNBs are under the control of the GW or a plurality of MMEs are connected to the GW in such an LTE (HeNB) system formed of the HeNBGW and the HeNB, it is impossible to accurately transmit the S1AP: DOWNLINK NON UE ASSOCIATED LPPA TRANSPORT message and the S1AP: UPLINK NON UE ASSOCIATED LPPA TRANSPORT message to the HeNB or the MME. In related art, in particular, there is a problem that it is impossible to accurately transmit the location information request (S1AP: DOWNLINK NON UE ASSOCIATED LPPA TRANSPORT message).

The reason therefor is that the S1AP: DOWNLINK NON UE ASSOCIATED LPPA TRANSPORT message does not include the information that specifies the HeNB. A similar problem also occurs in a relation between a Relay eNB and a Donor eNB and a relation between a Master eNB and a Slave eNB.

In view of the aforementioned problems, the present invention aims to provide a radio communication system, a radio communication method, a base control station, and a relay apparatus capable of accurately transmitting a location information request.

Solution to Problem

A radio communication system according to the present invention is a radio communication system including a relay apparatus connected between a base station and a base control station and a location information control station that manages location information of the base station, in which: the location information control station includes: a request generation unit for generating a location information request including regional information of a region for which the location information is requested; and a request transmission unit for transmitting the location information request that has been generated to the base control station, and the base control station includes: a request reception unit for receiving the location information request transmitted from the location information control station; and a request transmission unit for transmitting the location information request including the regional information in the location information request that has been received to the relay apparatus.

A radio communication method according to the present invention is a radio communication method in a radio communication system including a relay apparatus connected between a base station and a base control station and a location information control station that manages location information of the base station, in which: the location information control station generates a location information request including regional information of a region for which the location information is requested, the location information control station transmits the location information request that has been generated to the base control station, the base control station receives the location information request transmitted from the location information control station, and the base control station transmits the location information request including the regional information in the location information request that has been received to the relay apparatus.

A base control station according to the present invention is a base control station in a radio communication system including a relay apparatus connected between a base station and a base control station and a location information control station that manages location information of the base station, the base control station including: a request reception unit for receiving a location information request including regional information transmitted from the location information control station; and a request transmission unit for transmitting the location information request including the regional information in the location information request that has been received to the relay apparatus.

A relay apparatus according to the present invention is a relay apparatus in a radio communication system including a relay apparatus connected between a base station and a base control station and a location information control station that manages location information of the base station, the relay apparatus including: a request reception unit for receiving a location information request including regional information transmitted from the base control station; and a request transmission unit for transmitting a location information request to one or more base stations corresponding to the regional information in the location information request that has been received.

Advantageous Effects of Invention

According to the present invention, it is possible to provide a radio communication system, a radio communication method, a base control station, and a relay apparatus capable of accurately transmitting a location information request.

BRIEF DESCRIPTION OF DRAWINGS

FIG. 2B is a message sequence diagram showing the location control method of the LTE system according to the reference example;

FIG. 4 is a configuration diagram showing an internal configuration of a base control station according to the first exemplary embodiment;

FIG. 5 is a configuration diagram showing an internal configuration of a relay apparatus according to the first exemplary embodiment;

FIG. 6B is a message sequence diagram showing the location control method of the LTE system according to the first exemplary embodiment;

DESCRIPTION OF EMBODIMENTS (Reference Example)

Prior to the description of exemplary embodiments, a reference example before the exemplary embodiments are applied will be described.

Figure 1:
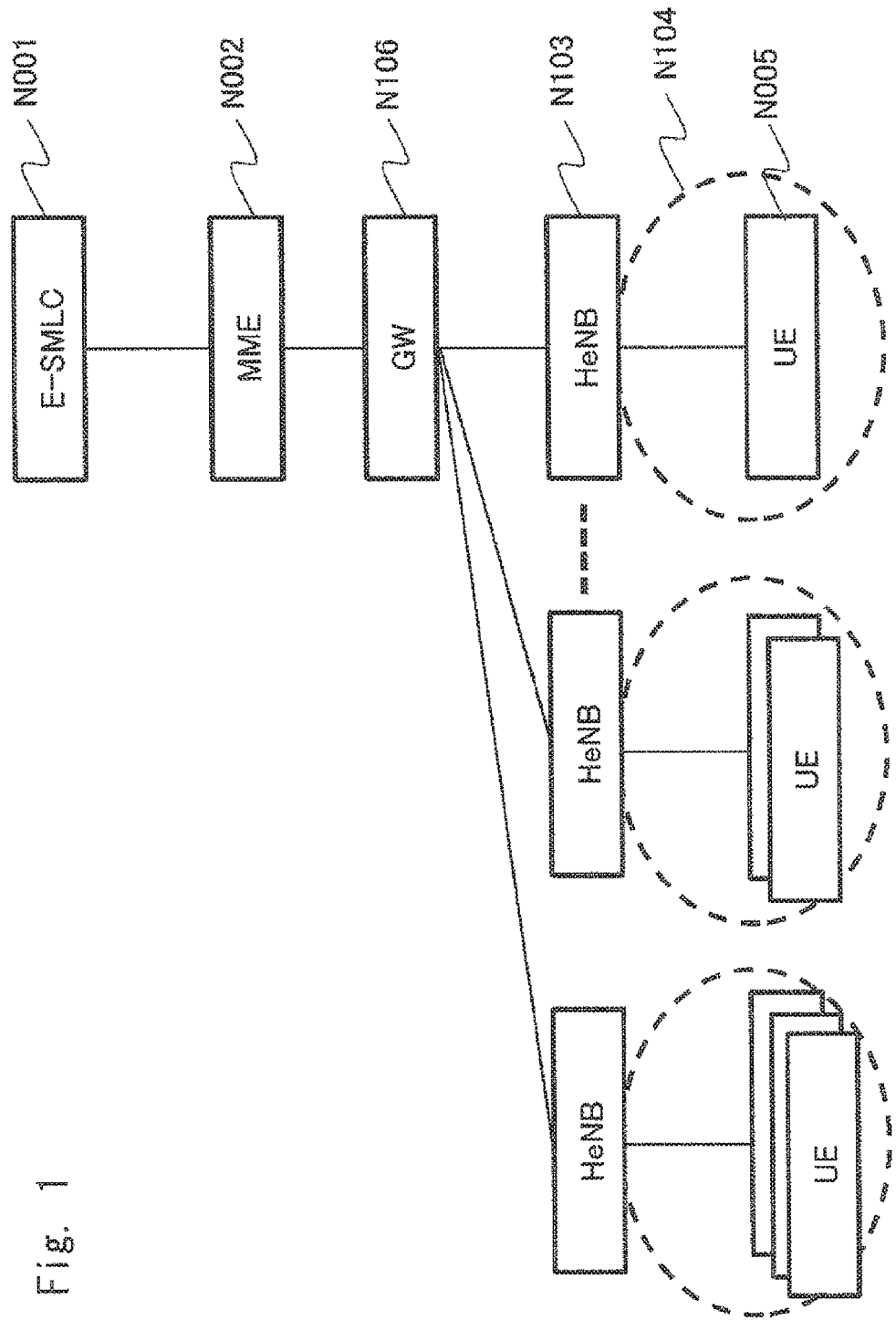
FIG. 1 is a configuration diagram showing a network configuration of an LTE system according to a reference example.
Figure 8:
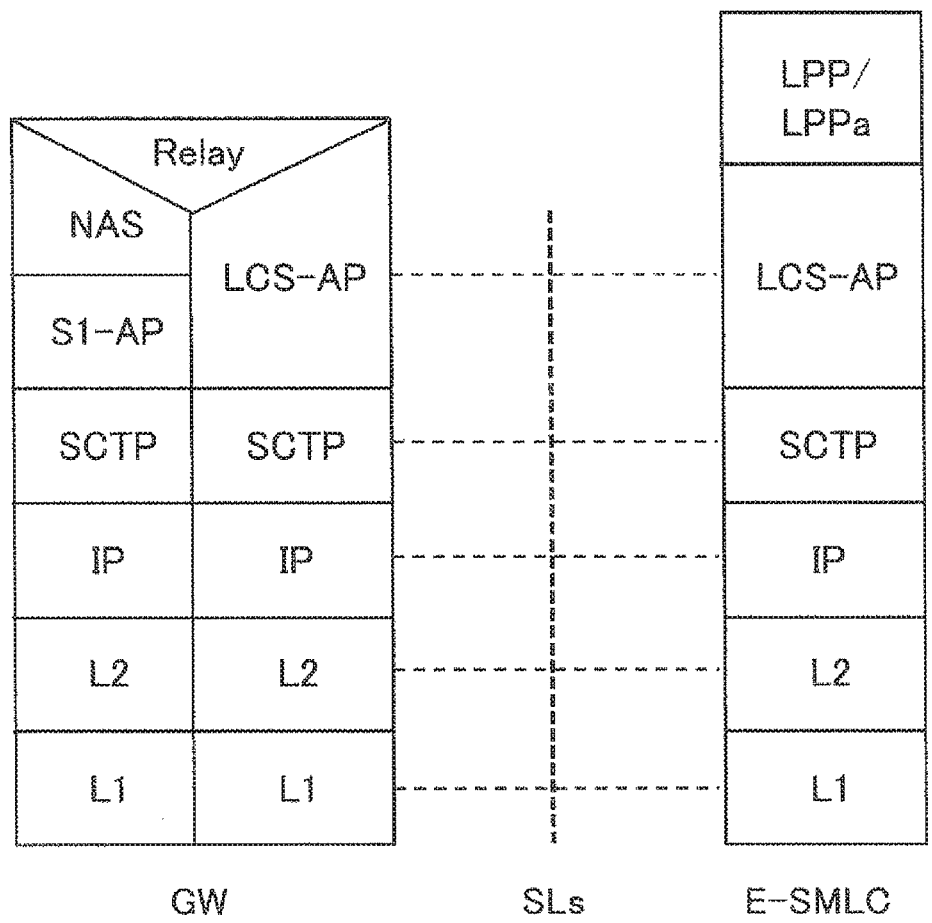
FIG. 8 is a diagram showing a protocol stack of the LTE system according to the second exemplary embodiment.

Network architectures defined by the 3GPP include an architecture in which an HeNBGW (GW) is provided between an MME and an HeNB, as shown in FIG. 4.6.1-2 of Non-Patent Literature 5. FIG. 1 shows one example of such an architecture as a reference example. The architectures in which the MME is not directly connected to a base station (eNB, HeNB, RN, SeNB, etc.) such as an architecture in which a Donor eNB (DeNB) is provided between an MME and a Relay Node (RN) as shown in FIG. 4.7.3-1 of Non-Patent Literature 5 and an architecture in which a Secondary eNB (SeNB) exists between a Master eNB (MeNB) and a UE as shown in FIG. 8.1.1-1 of Non-Patent Literature 6 are also expressed by the configuration shown in FIG. 1.

As shown in FIG. 1, an LTE system according to the reference example includes a UE (N005), a small radio base station HeNB (N103), a cell (N104) formed of the HeNB (N103), an MME (N002) that executes an in-network mobility management of the UE (N005), a GW (N106) that is located between the HeNB (N103) and the MME (N002) and aggregates (relays) an S1AP message or user data traffic between a plurality of HeNBs (N103) and the MME (N002), and an E-SMLC (N001) that manages and calculates location information of the UE (N005) and the HeNB (N003). The UE (N005) is located within the cell (N104) and is connected to the HeNB (N103). The roles of these nodes are disclosed in Non-Patent Literature 1 and 5.

Further, regarding the HeNB, an excessive number of HeNBs over 256 are generally connected to one HeNBGW. For example, 100,000 HeNBs are connected to one HeNBGW.

Figure 2A:
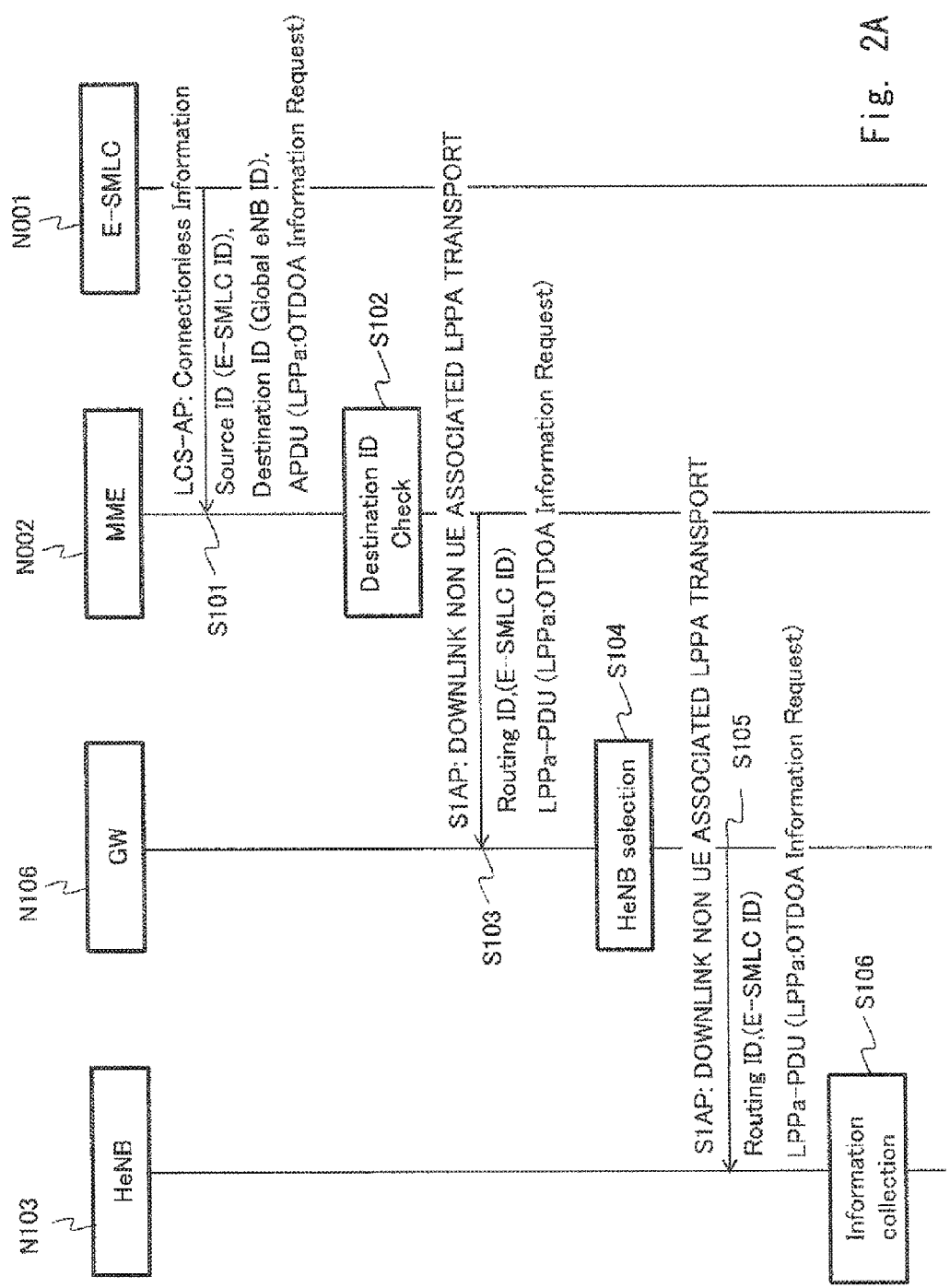
FIG. 2A is a message sequence diagram showing a location control method of the LTE system according to the reference example.
Figure 13:
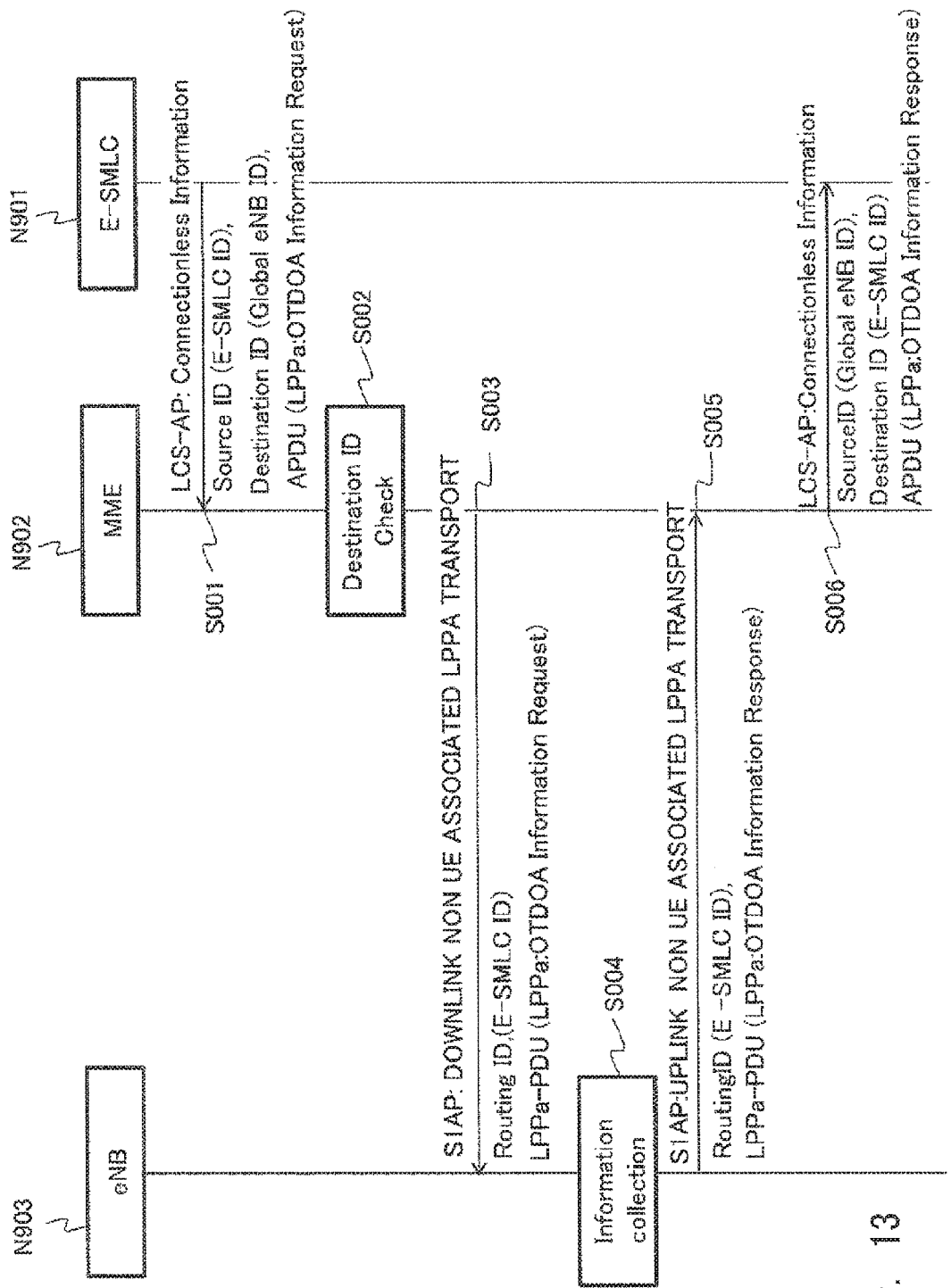
FIG. 13 is a message sequence diagram showing a location control method of the LTE system according to the related art.

In the architecture shown in FIG. 1, a problem occurs when transmission and reception of information collection messages of the eNB as shown in FIG. 13 are performed. FIGS. 2A and 2B show such a situation. This problem will be described with reference to the steps shown in FIGS. 2A and 2B.

As shown in FIGS. 2A and 2B, in S101, the E-SMLC (N001) transmits an LCS-AP: Connectionless Information message to the MME (N002) to obtain the location information on the HeNB (N103).

In S102, the MME (N002) searches for the destination to which a location control information message is to be forwarded according to a Destination Identity (Global eNB ID) of the LCS-AP: Connectionless Information message received from the E-SMLC (N001) in S101.

A problem 1 now occurs. That is, when the eNB ID that specifies the GW is set as a Destination Identity, it is possible to select the GW connected to the MME and make a transition to S103. However, unless location-related information of the HeNB which is under the control of the GW is set, it is impossible to obtain information to calculate the location information of the UE from OTDOA Cell Information which will be received later in S109. Therefore, the eNB ID that specifies each HeNB which is under the control of the GW is set as the Destination Identity and the MME selects the GW that connects this HeNB thereunder. Since there is typically an HeNBGW that aggregates the HeNBs and behaves as one eNB, the MME does not usually manage the eNB ID of each HeNB and it is impossible to know which GW the Global eNB ID belongs to.

In S103, the MME (N002) transmits an S1AP: DOWNLINK NON UE ASSOCIATED LPPA TRANSPORT message to the GW (N106) determined in S102.

In S104, the GW (N106) searches for the HeNB to which the S1AP: DOWNLINK NON UE ASSOCIATED LPPA TRANSPORT message is to be forwarded.

The problem 2 now occurs. That is, the S1AP: DOWNLINK NON UE ASSOCIATED LPPA TRANSPORT message does not include a Global eNB ID to specify the HeNB which is under the control of the GW.

Further, the problem 3 occurs. That is, when all the HeNBs that are under the control of the GW are targets for which the OTDOA Cell Information is to be acquired, as described above, the number of HeNBs connected to the HeNBGW generally exceeds 256, which is the number of HeNBs that can be set in the OTDOA Cell Information. The OTDOA Information Response message including the OTDOA Cell Information includes an LPPa Transaction ID and it is impossible to redundantly use the Transaction ID that specifies one procedure.

In S105, the GW (N106) transmits the S1AP: DOWNLINK NON UE ASSOCIATED LPPA TRANSPORT message to the HeNB (N103) that has been determined in S104.

In S106, the HeNB (N103) collects information on the HeNB (N103) according to an OTDOA Information Item included in the OTDOA Information Request received in S105.

In S107, the HeNB (N103) transmits an S1AP: UPLINK NON UE ASSOCIATED LPPA TRANSPORT message to the GW (N106).

In S108, the GW (N106) forwards the S1AP: UPLINK NON UE ASSOCIATED LPPA TRANSPORT message to the MME (N002).

In S109, the MME (N002) transmits an LCS-AP: Connectionless Information message to the E-SMLC (N001).

The problem 4 now occurs. That is, the series of processing S101 to S109 can only be repeatedly executed for each eNB that can be specified as the Destination Identity and cannot be executed for a plurality of eNBs at the same time.

In this embodiment, the above problems can be solved as follows, for example.

As one example of solving the problem 1, the MME manages the Global eNB ID of the HeNB which is under the control of the GW. The MME is therefore able to select the GW that connects the corresponding HeNB thereunder based on the Global eNB ID.

As one example of solving the problem 2, as is different from the normal S1AP message, the MME is connected to the eNB which is under the control of the GW via a direct interface and transmits the S1AP: DOWNLINK NON UE ASSOCIATED LPPA TRANSPORT message. The MME is therefore able to directly transmit the location information request to the eNB. A tunneling path between the MME and the may be constructed.

As another example of solving the problem 2, the E-SMLC is connected to the GW via the direct interface and the LCS-AP: Connectionless Information message is transmitted using the direct interface. The E-SMLC is therefore able to directly transmit the location information request to the GW. A tunneling path between the E-SMLC and the GW may be constructed. Regarding the other LCS-AP messages (e.g., LCS-AP: Connection Oriented message), the E-SMLC is transmitted via the MME as usual.

In order to solve the problem 2, the S1AP: DOWNLINK NON UE ASSOCIATED LPPA TRANSPORT message may include the Global eNB ID information that specifies the HeNB which is under the control of the GW or the Global eNB ID information that specifies the HeNB which is under the control of the GW may be included in the LPPa: OTDOA Information Request message included in the S1AP: DOWNLINK NON UE ASSOCIATED LPPA TRANSPORT message.

As one example of solving the problem 3, the number of cells that can be set in the OTDOA Information Response message is increased. It is therefore possible to deal with 256 or more cells. As another example of solving the problem 3, it is possible to transmit a plurality of OTDOA Information Response messages. By including Sub-Transaction ID to the message, it is possible to indicate the relations between one Transaction ID.

As one example of solving the problem 4, in the LCS-AP: Connectionless Information message, besides the eNB specified as the Destination Identity, location area information may be set. Accordingly, all the eNB location information of the eNBs located in this area become response messages. In this architecture, the GW may collect the response messages as one or a plurality of messages. The location area to be specified may include not only the address information or the latitude and longitude information but also a Positioning Area ID, a Tracking Area, an Emergency Area as a logic ID added to each eNB. In the HetNet environment, it may be the Cell Identity of the cell that covers the cell of the eNB.

(First Exemplary Embodiment)

Hereinafter, with reference to the drawings, a first exemplary embodiment will be described. This exemplary embodiment shows an example in which area information is specified by a location information request.

<Outline of First Exemplary Embodiment>

Figure 3:
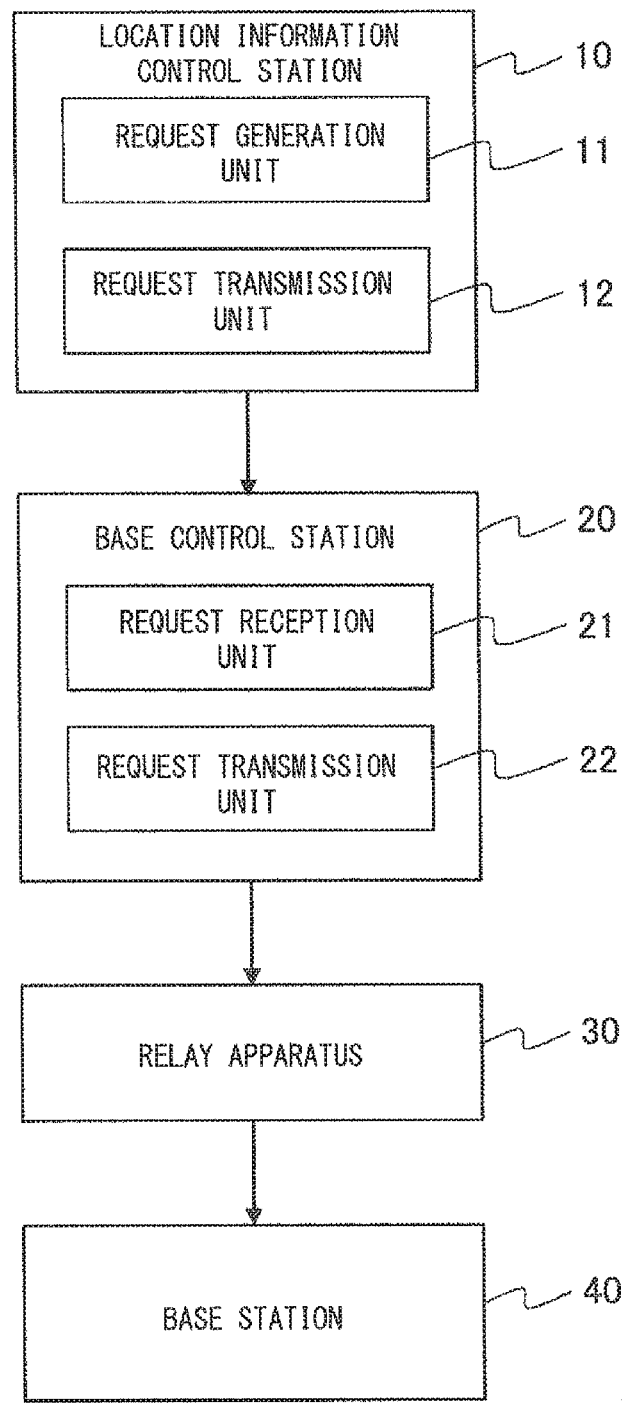
FIG. 3 is a configuration diagram showing an outline of a radio communication system according to a first exemplary embodiment.

First, an outline of this exemplary embodiment will be described. FIG. 3 shows an outline of a radio communication system according to this exemplary embodiment. As shown in FIG. 3, the radio communication system according to this exemplary embodiment includes a relay apparatus 30 connected between a base station 40 and a base control station 20 and a location information control station 10 that manages location information of the base station 40.

The location information control station 10 includes a request generation unit 11 that generates a location information request including regional information of a region for which location information is requested and a request transmission unit 12 that transmits the location information request that has been generated to the base control station 20. The base control station 20 further includes a request reception unit 21 that receives the location information request transmitted from the location information control station and a request transmission unit 22 that transmits the location information request including the regional information in the location information request that has been received to the relay apparatus 30.

In this exemplary embodiment, by specifying the regional information (area information) in the location information request as stated above, it is possible to accurately transmit (forward) the location information request to the base station included in this region.

<Configuration of First Exemplary Embodiment>

A network configuration of a node in this exemplary embodiment is similar to that of FIG. 1. That is, an LTE system (radio communication system) according to this exemplary embodiment includes, as shown in FIG. 1, a UE (N005), an HeNB (N103), a cell (N104), an MME (N002), a GW (N106), and an E-SMLC (N001). For example, the E-SMLC (N001) according to this exemplary embodiment includes a location-related information message generation unit (request generation unit) that generates a location-related information message (location information request) and a location-related information message transmission unit (request transmission unit) that transmits the location-related information message that has been generated to the MME (N002) (not shown).

While the case in which an HeNBGW is connected between the HeNB and the MME is expressed as one example in this exemplary embodiment, this exemplary embodiment may be applied also to the architecture in which a relay apparatus is connected between the MME and the base station having a desired form (eNB, HeNB, RN, SeNB, etc.).

FIGS. 4 and 5 respectively show the internal configuration of the MME (N002) according to this exemplary embodiment and the internal configuration of the GW (N106) according to this exemplary embodiment shown in FIG. 1.

As shown in FIG. 4, the MME (N002) according to this exemplary embodiment includes an HeNB and GW information database (HeNB/GW Information DB) N0021 including information on the HeNB (N103) connected to the GW (N106) in such a way that the HeNB (N103) is under the control of the GW (N106) and information on the GW (N106) connected to the HeNB (N103), a location-related information message processing unit (Location Information message processing part) N0022, and a location-related information message forward unit (Location Information message forwarding part) N0023. It can also be said, for example, that the location-related information message processing unit N0022 is a location-related information message reception unit (request reception unit) that receives the location-related information message (location information request) transmitted from the E-SMLC (N001) and the location-related information message forward unit N0023 is a location-related information message transmission unit (request transmission unit) that transmits a message to the GW (N106) or the HeNB (N103) based on the location-related information message that has been received. Further, it can also be said that the location-related information message processing unit N0022 is a location-related information message reception unit (response reception unit) that receives the location-related information message (location information response) from one or more HeNBs (N103) or the GWs (N106) and the location-related information message forward unit N0023 is a location-related information message transmission unit (response transmission unit) that aggregates the location-related information messages (location information responses) that have been received and transmits the aggregated messages to the E-SMLC (N001). The components regarding the other function units in the MME (N002) are omitted since they do not have a direct relationship with this exemplary embodiment.

As shown in FIG. 5, the GW (N106) according to this exemplary embodiment includes an HeNB information database (HeNB Information DB) N1061 including information on the HeNB (N103) connected to the GW (N106) in such a way that the HeNB (N103) is under the control of the GW (N106), a location-related information message processing unit (Location Information message processing part) N1062, and a location-related information message forward unit (Location Information message forwarding part) N1063. It can also be said, for example, that the location-related information message processing unit N1062 is a location-related information message reception unit (request reception unit) that receives the location-related information message (location information request) transmitted from the MME (N002) and the location-related information message forward unit N1063 is a location-related information message transmission unit (request transmission unit) that transmits a message to one or more HeNBs (N103) based on the location-related information message that has been received. Further, it can be said that the location-related information message processing unit N1062 is a location-related information message reception unit (response reception unit) that receives a location-related information message (location information response) from one or more HeNBs (N103) and the location-related information message forward unit N1063 is a location-related information message transmission unit (response transmission unit) that aggregates the location-related information messages (location information responses) that have been received and transmits the aggregated messages to the MME (N002). The components regarding the other function units in the GW (N106) are omitted since they do not have a direct relationship with this exemplary embodiment.

The HeNB and GW information database N0021 shown in FIG. 4 stores the location information area including the HeNB (N103) connected to the GW (N106) and the information on the GW (N106) corresponding to the location information area. One HeNB (N103) may belong to a plurality of location information areas or one GW (N106) may belong to a plurality of location information areas since the GW (N106) is connected to the HeNBs (N103) in location information areas different from one another. Specific examples of the location information area include, besides the address, the zip code, and the latitude and longitude information, a Tracking Area Identity (TAI), an Emergency Area, a CSG ID, a Cell Identity of a Macro Cell that covers the HeNB.

The HeNB information database N1061 shown in FIG. 5 stores information on the location information area of the HeNB (N103) connected to the GW (N106).

<Operation of First Exemplary Embodiment>

The operation of this exemplary embodiment will be described using a message sequence diagram shown in FIGS. 6A and 6B. The operation shown in FIGS. 6A and 6B is substantially similar to that of FIGS. 2A and 2B except for the following point.

Figure 6A:
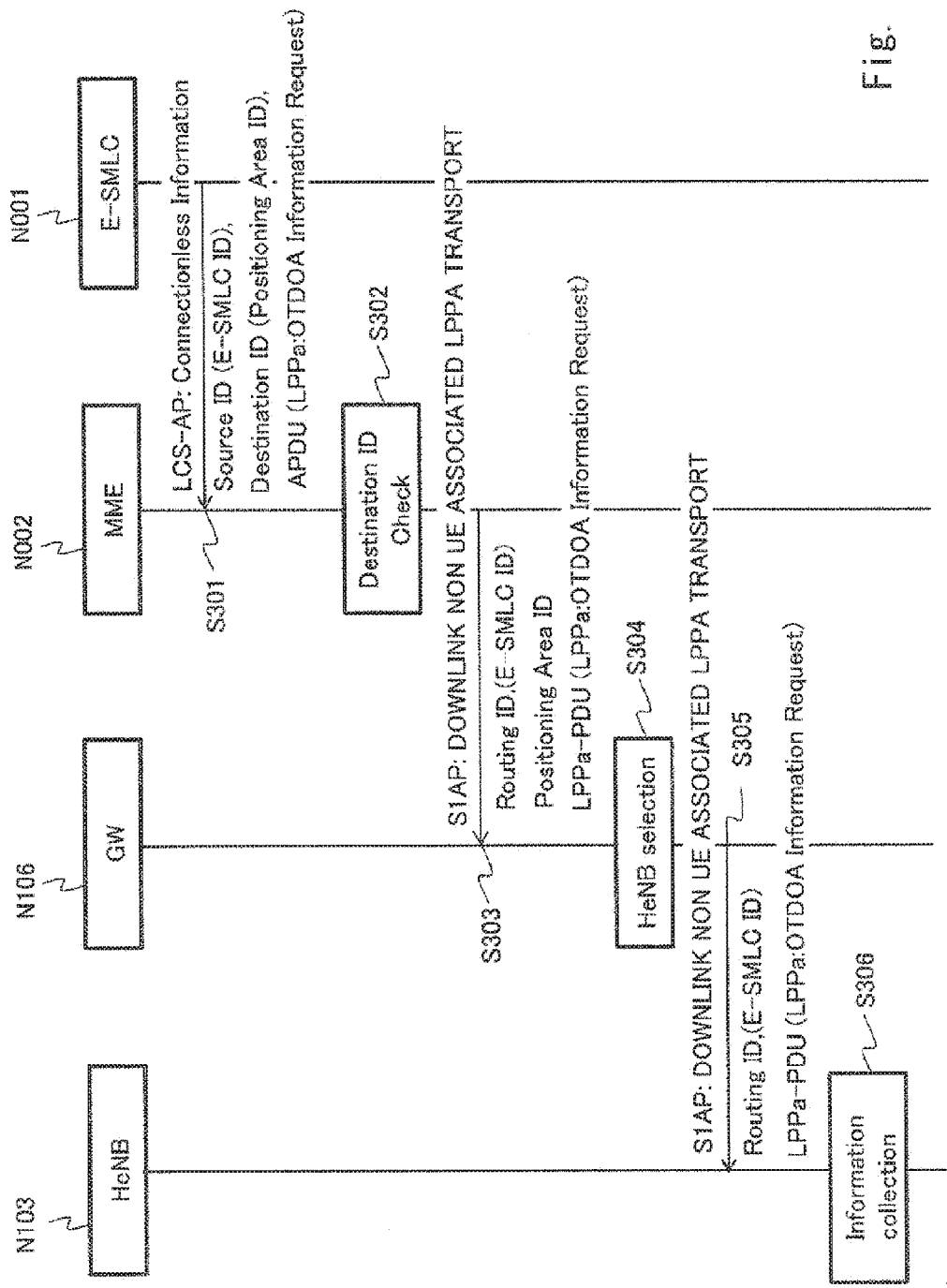
FIG. 6A is a message sequence diagram showing a location control method of an LTE system according to the first exemplary embodiment.

As shown in FIGS. 6A and 6B, in S301, the E-SMLC (N001) transmits an LCS-AP: Connectionless Information message to the MME (N002) to obtain the location information on the HeNB (N103).

In S301 in this exemplary embodiment, the E-SMLC (N001) specifies the location information area (Positioning Area ID) regarding which the information is desired to be acquired in place of the Global eNB ID in the Destination Identity.

In S302, the MME (N002) searches for the destination to which the location control information message is to be forwarded according to the Destination Identity (Positioning Area ID) included in the LCS-AP: Connectionless Information message received from the E-SMLC (N001) in S301.

In S302 in this exemplary embodiment, the MME (N002) analyzes the location-related information message received in S301 by the location-related information message processing unit N0022 shown in FIG. 4. The information on the GW (N106) connected to the HeNB (N103) of the area corresponding to the Positioning Area ID included in the Destination Identity is extracted from the HeNB and GW information database N0021. The MME (N002) then forwards the location-related information message to the GW (N106) extracted from the HeNB and GW information database N0021 in the location-related information message forward unit N0023.

In S303, the MME (N002) transmits an S1AP: DOWNLINK NON UE ASSOCIATED LPPA TRANSPORT message to the GW (N106) that has been determined in S302.

In S303 in this exemplary embodiment, the MME (N002) sets the area information (Positioning Area ID) of the HeNB information obtained from the location information database of the GW information extracted from the database in S302 in the S1AP: DOWNLINK NON UE ASSOCIATED LPPA TRANSPORT message received in S301. The Destination Identity set in the LCS-AP: Connectionless Information in S301 may be set. The area information of the HeNB information may be set in the LPPa: OTDOA Information Request message included in the S1AP: DOWNLINK NON UE ASSOCIATED LPPA TRANSPORT message.

Further, in S303 in this exemplary embodiment, when there are a plurality of HeNBs and eNBs that are within the location information area specified by the E-SMLC (N001), the MME (002) may forward the location-related information message to the plurality of HeNBs, the GWs, and the eNBs.

In S304, the GW (N106) searches for the HeNB (N103) to which the S1AP: DOWNLINK NON UE ASSOCIATED LPPA TRANSPORT message is to be forwarded.

In S304 in this exemplary embodiment, the GW (N106) analyzes the location-related information message received in S303 by the location-related information message processing unit N1062 shown in FIG. 5. The information on the HeNB (N103) corresponding to the area information included in the Destination Identity is extracted from the HeNB information database N1061. The GW (N106) then forwards the location-related information message to the HeNB (N103) extracted from the HeNB information database N1061 in the location-related information message forward unit N1063.

Further, in S303 in this exemplary embodiment, when there are a plurality of HeNBs that are within the location information area specified by the MME (N002), the GW (N106) may forward the location-related information message to the plurality of HeNBs.

In S305, the GW (N106) transmits an S1AP: DOWNLINK NON UE ASSOCIATED LPPA TRANSPORT message to the HeNB (N103) determined in S304.

In S306, the HeNB (N103) collects information on the HeNB (N103) according to the OTDOA Information Item included in the OTDOA Information Request received in S305.

In S307, the HeNB (N103) transmits the S1AP: UPLINK NON UE ASSOCIATED LPPA TRANSPORT message to the GW (N106).

In S308, the GW (N106) forwards the S1AP: UPLINK NON UE ASSOCIATED LPPA TRANSPORT message to the MME (N002).

In S308 in this exemplary embodiment, when the GW (N106) forwards the S1AP: DOWNLINK NON UE ASSOCIATED LPPA TRANSPORT message to the plurality of HeNBs (N103) in S305, the GW (N106) acquires the S1AP: UPLINK NON UE ASSOCIATED LPPA TRANSPORT messages from the plurality of HeNBs (N103) in S307. In the S1AP: UPLINK NON UE ASSOCIATED LPPA TRANSPORT message transmitted to the MME (N002), the plurality of S1AP: UPLINK NON UE ASSOCIATED LPPA TRANSPORT messages received in S307 are aggregated and the aggregated messages are transmitted to the MME. The messages may be transmitted by one message or separately transmitted. When the messages are separately transmitted, one LPPa Transaction ID (process number) included in the LPPa: OTDOA Information Response message is used. When the messages are separately transmitted, identifiers indicating the relation among the messages may be added. For example, Sub-Transaction IDs (sub-process numbers) or the like may be added. Further, the number of pieces of cell information of the LPPa: OTDOA Information Response included in one S1AP: UPLINK NON UE ASSOCIATED LPPA TRANSPORT message may be larger than 256 cells specified in Non-Patent Literature 4.

In S309, the MME (N002) transmits the LCS-AP: Connectionless Information message to the E-SMLC (N001).

In S309 in this exemplary embodiment, when the MME (N002) forwards the S1AP: DOWNLINK NON UE ASSOCIATED LPPA TRANSPORT message to the plurality of HeNBs, the eNBs, and the GWs in S303, it acquires the S1AP: UPLINK NON UE ASSOCIATED LPPA TRANSPORT messages from the plurality of HeNBs, the eNBs, and the GWs in S308. In the LCS-AP: Connectionless Information message transmitted to the E-SMLC (N001), the plurality of S1AP: UPLINK NON UE ASSOCIATED LPPA TRANSPORT messages received in S308 are aggregated and the aggregated messages are transmitted to the E-SMLC. The messages may be transmitted by one message or separately transmitted. When the messages are separately transmitted, a constant value is used as the LPPa Transaction ID included in the LPPa: OTDOA Information Response message. When the messages are separately transmitted, identifiers indicating the relations among the messages may be added. For example, Sub-Transaction IDs or the like may be added. Further, the number of pieces of cell information of the LPPa: OTDOA Information Response included in one S1AP: UPLINK NON UE ASSOCIATED LPPA TRANSPORT message may be larger than 256 cells defined in Non-Patent Literature 4.

<Effects of First Exemplary Embodiment>

The effects of this exemplary embodiment will be as follows.

First, since the E-SMLC specifies the location area information and transmits the location information request to the MME and the MME holds the location area information of the HeNB connected to the GW in the network including the relay apparatus GW such as the GW or the DeNB between the MME and the HeNB or the eNB, it is possible to determine to which GW the MME should forward the location-related information message from the location area information specified from the E-SMLC, whereby the E-SMLC is able to accurately acquire the location information of the HeNB specified by the E-SMLC.

Second, since the MME sets the location area information in the S1AP: DOWNLINK NON UE ASSOCIATED LPPA TRANSPORT message transmitted to the GW from the MME, it is possible to determine to which HeNB the GW should forward the location-related information message, whereby the E-SMLC is able to accurately acquire the location information of the HeNB.

Third, the MME forwards the location-related information message to one or a plurality of HeNBs, GWs, and eNBs corresponding to the location area information specified from the E-SMLC, aggregates the location-related information messages received from the HeNBs, the GWs, and the eNBs, and transmits the aggregated messages to the E-SMLC, the E-SMLC is able to acquire the information on the plurality of base stations by one message without repeatedly transmitting the messages for the number of base stations for each Global eNB ID of each eNB and each HeNB.

Fourth, since the GW forwards the location-related information message to one or a plurality of HeNBs corresponding to the location area information specified from the MME, aggregates the location-related information messages received from the HeNBs, and transmits the aggregated messages to the MME, the E-SMLC is able to acquire the information on the plurality of base stations by one message without repeatedly transmitting the messages for the number of base stations for each Global eNB ID of each HeNB.

(Second Exemplary Embodiment)

Hereinafter, with reference to the drawings, a second exemplary embodiment will be described. In this exemplary embodiment, the E-SMLC directly exchanges messages with the GW.

<Configuration of Second Exemplary Embodiment>

Figure 7:
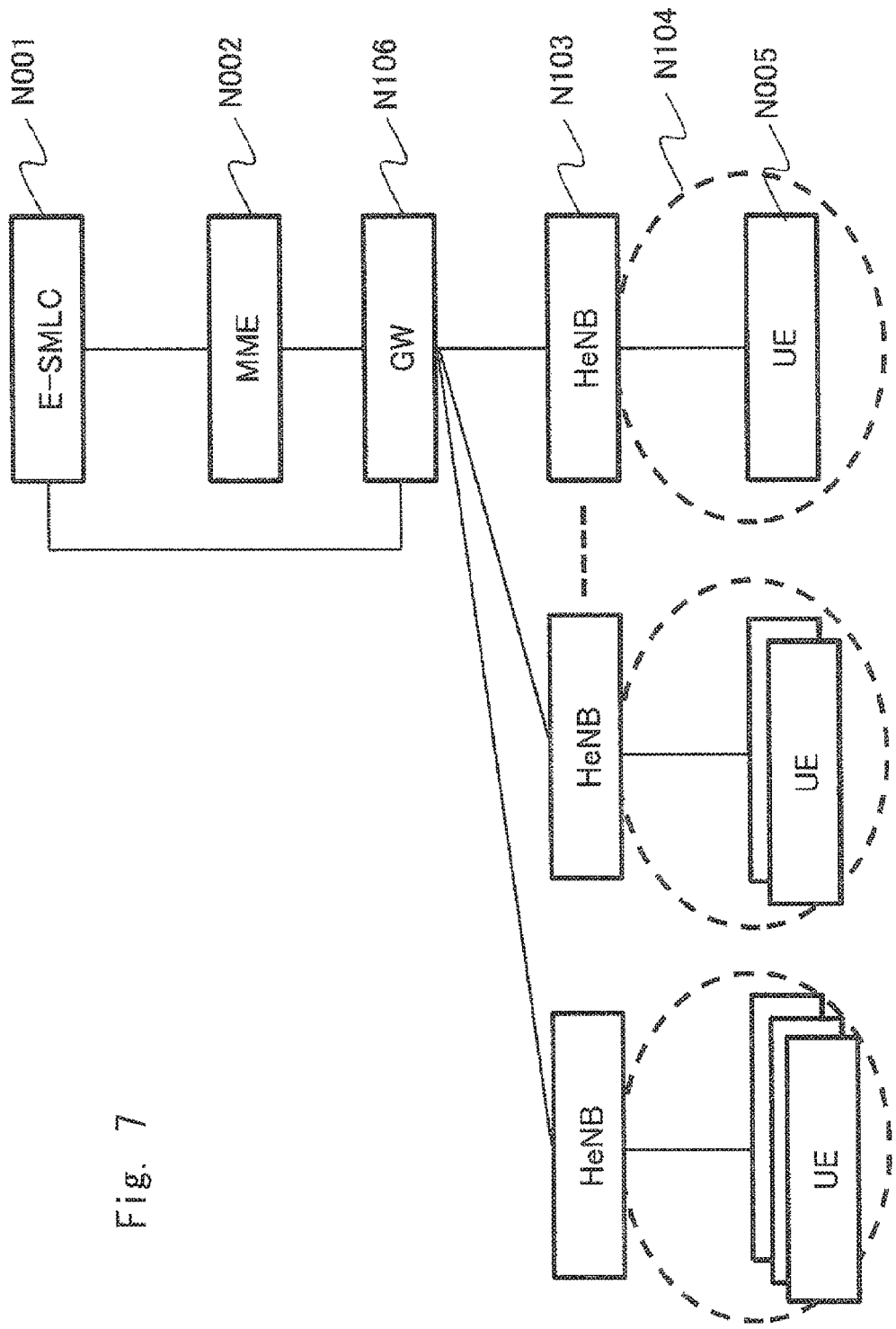
FIG. 7 is a configuration diagram showing a network configuration of an LTE system according to a second exemplary embodiment.

With reference to FIG. 7, a configuration of this exemplary embodiment will be described. While the components shown in FIG. 7 are the same as those shown in FIG. 1, the E-SMLC (N001) is able to be directly connected to the GW (N106) in FIG. 7. According to FIGS. 5.2-1 of Non-Patent Literature 2, the protocol of the LCS-AP is defined to be an SLs Interface between the MME and the E-SMLC. However, in this exemplary embodiment, as shown in FIG. 8, the protocol of the LCS-AP is re-defined to be an SLs' Interface between the GW and the E-SMLC. The path between the GW (N106) and the E-SMLC (N001) may be formed as a tunnel path in the MME (N002).

<Operation of Second Exemplary Embodiment>

Figure 9:
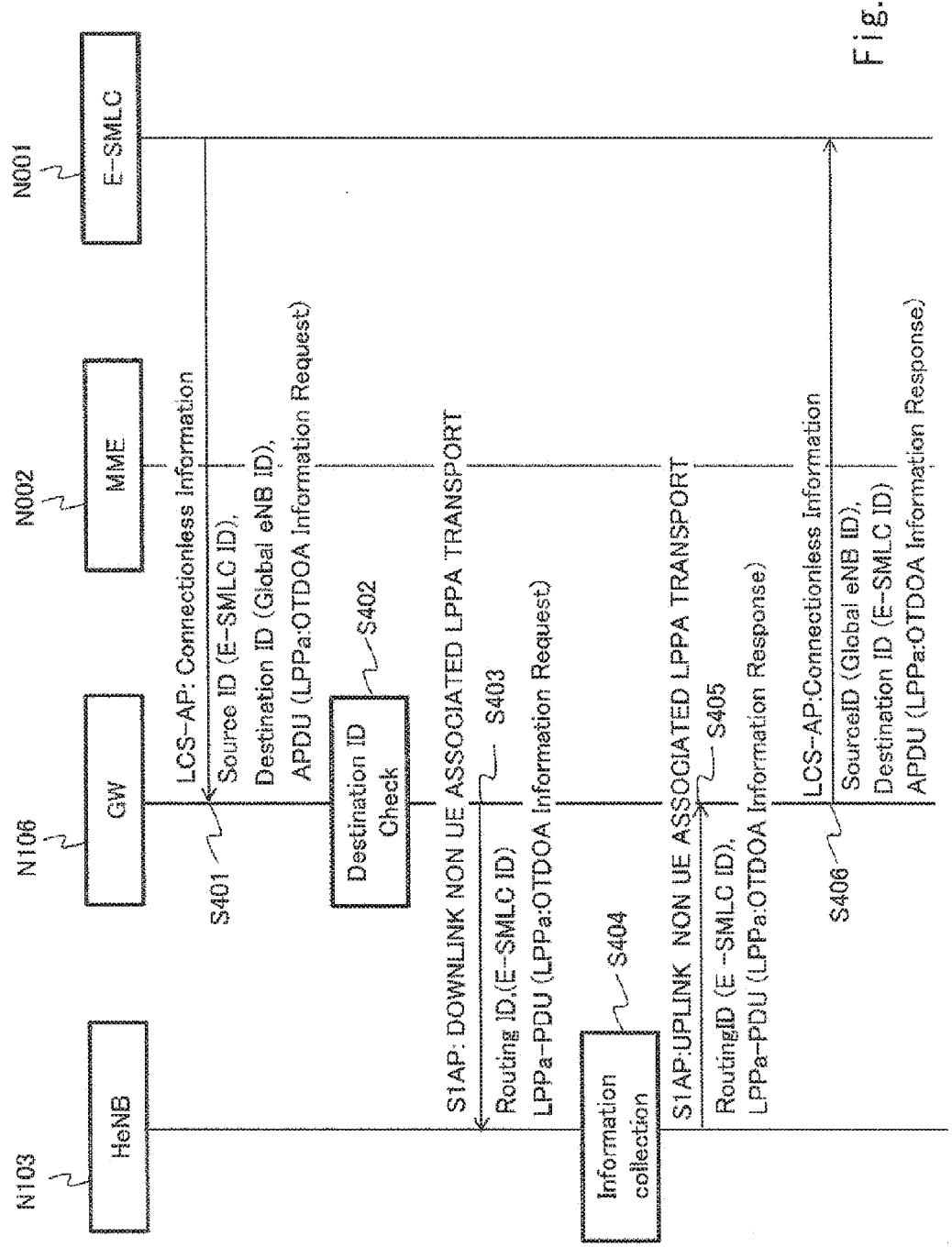
FIG. 9 is a message sequence diagram showing a location control method of the LTE system according to the second exemplary embodiment.

An operation of this exemplary embodiment will be described using a message sequence diagram shown in FIG. 9. The operation shown in FIG. 9 is substantially equal to that of FIG. 13 except for the following point.

In S401, the E-SMLC (N001) transmits an LCS-AP: Connectionless Information message.

In S401 in this exemplary embodiment, the E-SMLC (N001) directly transmits this message to the GW (N106). This message is transmitted when the Global eNB ID set as the Destination ID indicates the HeNB (N103) which is under the control of the GW (N106).

In S402, the GW (N106) determines the HeNB (N103) to which the location control information message will be transmitted according to the Global eNB ID specified as the Destination Identity included in the LCS-AP: Connectionless Information message received from the E-SMLC (N001) in S401.

In S403, the GW (N106) transmits an S1AP: DOWNLINK NON UE ASSOCIATED LPPA TRANSPORT message to the HeNB (N103) that has been determined in S402.

In S404, the HeNB (N103) collects information on the HeNB (N103) according to an OTDOA Information Item included in the OTDOA Information Request received in S403.

In S405, the HeNB (N103) transmits an S1AP: UPLINK NON UE ASSOCIATED LPPA TRANSPORT message to the GW (N106).

In S406, the GW (N106) transmits an LCS-AP: Connectionless Information message. In S406 in this exemplary embodiment, the GW (N106) directly transmits this message to the E-SMLC (N001).

Regarding the other LCS-AP messages (e.g., LCS-AP: Connection Oriented message), the E-SMLC (N001) transmits the message via the MME (N002) as usual. In this case, as shown in FIGS. 5.2-1 of Non-Patent Literature 2, the SLs Interface between the MME and the E-SMLC is used as the protocol of the LCS-AP.

<Effects of Second Exemplary Embodiment>

The effects of this exemplary embodiment are as follows.

First, since the protocol message of the LCS-AP is exchanged between the E-SMLC and the GW, the GW is able to acquire the target Global eNB ID information, determine to which eNB the location-related information message should be transmitted, whereby the E-SMLC is able to accurately acquire the location information of the HeNB specified by the E-SMLC.

Second, since the protocol message of the LCS-AP is exchanged between the E-SMLC and the GW, additional parameters are not required for the protocol of the LCS-AP and the protocol of the S1AP. It is therefore possible to accurately acquire the location information of the HeNB specified by the E-SMLC without influencing the E-SMLC, the MME, and the eNB.

Third, since the LSC-AP message other than the connectionless message of the LCS-AP is transmitted via the MME from the E-SMLC, it is possible to execute the procedure regarding the LCS-AP executed by the E-SMLC without influencing the E-SMLC, the MME, and the eNB.

(Third Exemplary Embodiment)

Hereinafter, with reference to the drawings, a third exemplary embodiment will be described. This exemplary embodiment is an example in which the MME directly transmits the S1AP: DOWNLINK NON UE ASSOCIATED LPPA TRANSPORT message to the HeNB.

<Configuration of Third Exemplary Embodiment>

Figure 10:
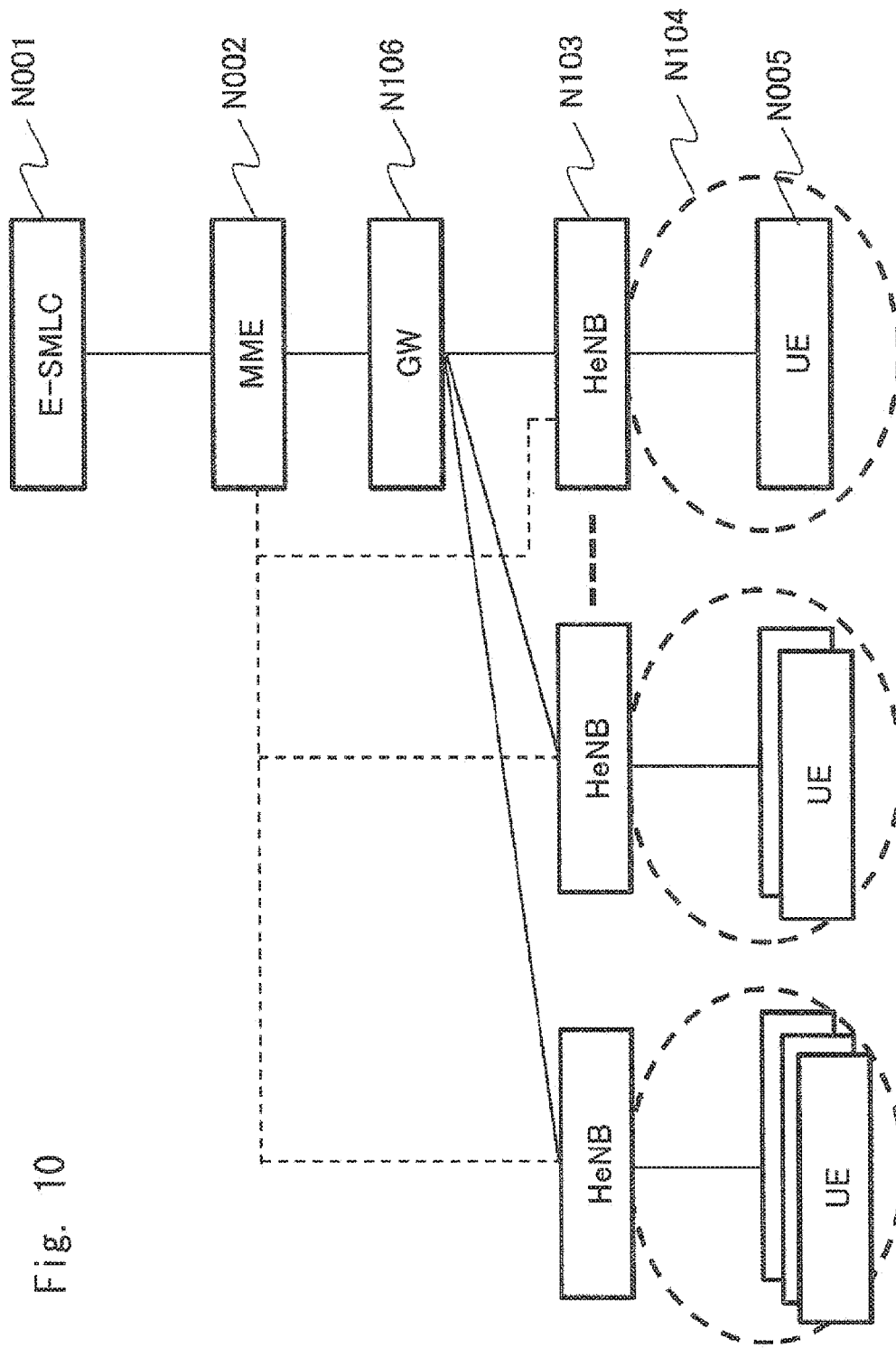
FIG. 10 is a configuration diagram showing a network configuration of an LTE system according to a third exemplary embodiment.

With reference to FIG. 10, a configuration of this exemplary embodiment will be described. The components shown in FIG. 10 are the same as those shown in FIG. 1. In this exemplary embodiment, the MME (N002) can be connected to the HeNB (N103) via the GW (N106) or directly connected thereto. The path between the MME (N002) and the HeNB (N103) may be formed as a tunnel path in the GW (N106).

In the internal configuration of the MME (N002), the HeNB and the GW information database N0021 shown in FIG. 4 store the Global eNB ID information of each HeNB (N103) and the path.

<Operation of Third Exemplary Embodiment>

Figure 11:
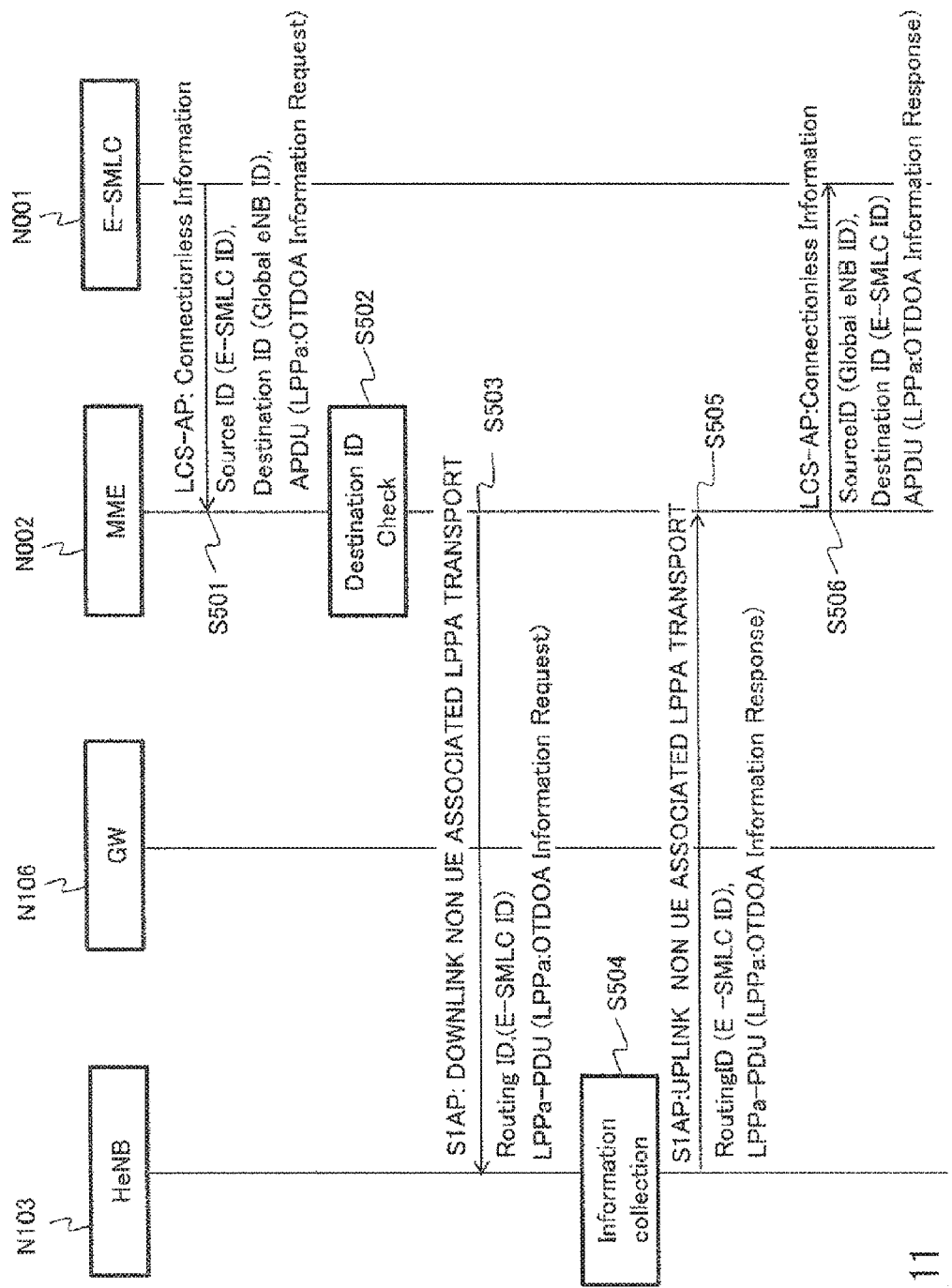
FIG. 11 is a message sequence diagram showing a location control method of the LTE system according to the third exemplary embodiment.

The operation of this exemplary embodiment will be described using a message sequence diagram shown in FIG. 11. The operation shown in FIG. 11 is substantially similar to that in FIG. 13 except for the following point.

In S501, the E-SMLC (N001) transmits an LCS-AP: Connectionless Information message to the MME (N002).

In S502, the MME (N002) determines the HeNB (N103) to which the location control information message will be forwarded according to the Global eNB ID specified as the Destination Identity included in the LCS-AP: Connectionless Information message received from the E-SMLC (N001) in S501.

In S502 of the present invention, the MME (N002) analyzes the location-related information message received in S501 by the location-related information message processing unit N0022 shown in FIG. 4. The information on the HeNB (N103) corresponding to the Global eNB Identity included in the Destination Identity is extracted from the HeNB and GW information database N0021. The MME (N002) then forwards the location-related information message to the HeNB (N103) extracted from the HeNB and GW information database N0021 in the location-related information message forward unit N0023. In generality, although the S1AP messages are collectively controlled by the GW (N106) in the HeNB (N103), the S1AP message regarding the location control information message can be transmitted to the HeNB (N103) without passing the GW (N106).

In S503, the MME (N002) transmits an S1AP: DOWNLINK NON UE ASSOCIATED LPPA TRANSPORT message to the HeNB (N103) that has been determined in S502.

In S504, the HeNB (N103) collects information on the HeNB (N103) according to an OTDOA Information Item included in the OTDOA Information Request received in S503.

In S505, the HeNB (N103) transmits an S1AP: UPLINK NON UE ASSOCIATED LPPA TRANSPORT message to the MME (N002).

In S505 in this exemplary embodiment, the HeNB (N103) directly transmits this message to the MME (N002). Even when the S1AP protocol message is collectively managed by the GW (N106), the HeNB (N103) is able to transmit this message to the MME (N002).

In S506, the MME (N002) transmits an LCS-AP: Connectionless Information message to the E-SMLC (N001).

The S1AP: UPLINK NON UE ASSOCIATED LPPA TRANSPORT message in S505 may be transmitted via the GW (N106). In this case, the Global eNB ID the same as the Destination ID corresponding to the LPPa Transaction ID included in the OTDOA Information Request in the LCS-AP: Connectionless Information message transmitted in S501 is set as the Source ID of the LCS-AP: Connectionless Information message transmitted by the MME (N002).

<Effects of Third Exemplary Embodiment>

The effects of this exemplary embodiment are as follows.

First, since the MME holds the HeNB information and the path, the MME is able to specify the destination to which the location information request message is to be forwarded from the Global eNB ID information set in the Destination ID included in the LCS-AP: Connectionless Information message, whereby the E-SMLC is able to accurately acquire the location information of the HeNB specified by the E-SMLC.

Second, since the MME directly transmits the S1AP: DOWNLINK NON UE ASSOCIATED LPPA TRANSPORT message to the HeNB, the E-SMLC is able to accurately acquire the location information of the HeNB specified by the E-SMLC.

Third, there is no need to add parameters for the protocol of the LSC-AP and the protocol of the S1AP to exchange the S1AP: DOWNLINK NON UE ASSOCIATED LPPA TRANSPORT message and the S1AP: UPLINK NON UE ASSOCIATED LPPA TRANSPORT message between the MME and the HeNB without passing the GW, whereby it is possible to accurately acquire the location information of the HeNB specified by the E-SMLC without influencing the E-SMLC, the MME, and the eNB.

(Fourth Exemplary Embodiment)

This exemplary embodiment may be a location information control method that uses another control route by an O&M server (Operation & Maintenance) or the like.

For example, an intermediate path may be changed as described in the second and third exemplary embodiments and the E-SMLC is able to acquire the location information of the HeNB from the management system that manages the HeNB or from the HeNB via the management system without passing both the GW and the MME.

It is therefore possible to accurately acquire the location information of the HeNB specified by the E-SMLC.

(Fifth Exemplary Embodiment)

In a mobile network, in general, the information and the state of a cell and the information and the state of a neighboring cell are dynamically changed due to Self Organizing Network (SON), an Energy Saving, a Self healing function such as a Cell Outage Compensation, and a movement of the base station by a Mobile Relay eNB function or the like.

When the information and the state of the cell and the information and the state of the neighboring cell are dynamically changed as described above in the first to fourth exemplary embodiments, in particular, when a part of the cell information such as the eNB ID of the HeNB, the Cell Identity, the Physical Cell Identity (PCI), the location information of the HeNB is changed among the location information of the HeNB, a message indicating the changes in the information may be transmitted from the HeNB to update the database in the GW, the database in the MME, and the HeNB location information acquired by the E-SMLC.

It is therefore possible to acquire the location information of the HeNB specified by the E-SMLC always accurately as the latest information.

(Sixth Exemplary Embodiment)

Figure 12:
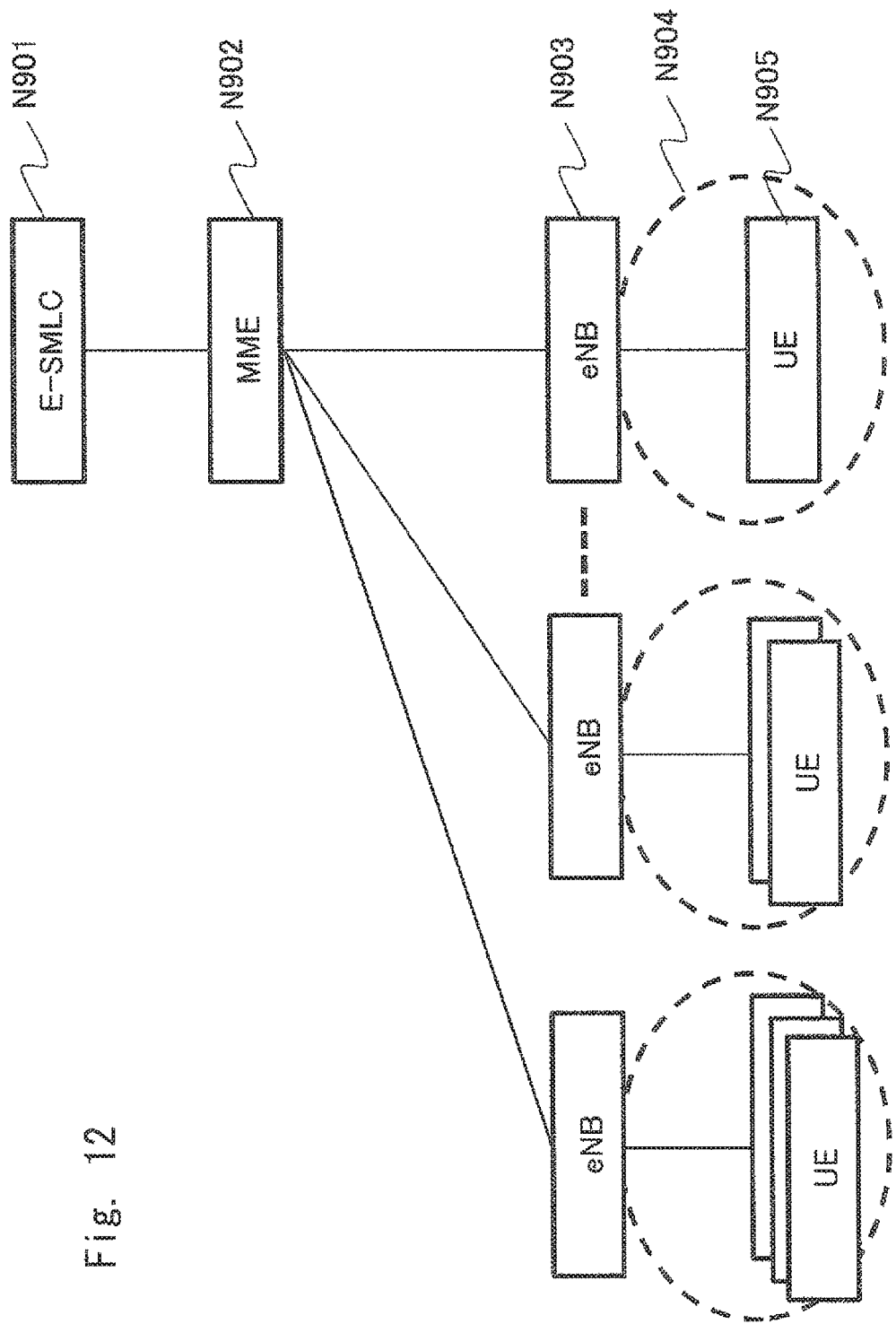
FIG. 12 is a configuration diagram showing a network configuration of an LTE system according to a related art.

While the first exemplary embodiment relates to the control method that focuses the LPPa: DOWNLINK NON UE ASSOCIATED LPPA TRANSPORT message, there is also a problem when there are a plurality of MMEs (N902)

shown in FIG. 12 in the destination to which the S1AP: UPLINK NON UE ASSOCIATED LPPA TRANSPORT message is forwarded.

While the S1AP: UPLINK NON UE ASSOCIATED LPPA TRANSPORT message includes the Routing ID included in the LPPa: DOWNLINK NON UE ASSOCIATED LPPA TRANSPORT message, it is required to map the MME that has transmitted the LPPa: DOWNLINK NON UE ASSOCIATED LPPA TRANSPORT message received by the GW from the MME, the Routing ID that set in the S1AP: UPLINK NON UE ASSOCIATED LPPA TRANSPORT message, the information on the HeNB to which the message is transferred, and the information on the HeNB which receives the message.

The S1AP: UPLINK NON UE ASSOCIATED LPPA TRANSPORT message may include the information on the MME.

While the case in which the HeNBGW is connected between the HeNB and the MME is shown as one example in the second to sixth exemplary embodiments, similar to the first exemplary embodiment, the present invention can be applied also to the architecture in which the relay apparatus is connected between the MME and the base station having a desired form (eNB, HeNB, RN, SeNB etc.).

Note that the present invention is not limited to the above exemplary embodiments and may be changed as appropriate without departing from the spirit of the present invention.

The configurations in the aforementioned exemplary embodiments may be formed of a hardware, a software, or both of them, and may be formed of one hardware or one software or a plurality of hardware or software. The functions (processes) of the nodes may be implemented by a computer including a CPU, a memory or the like. For example, a communication program for performing the communication method (communication processing) in the exemplary embodiments may be stored in the storage device and each function may be implemented by executing the communication program stored in the storage device by the CPU.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While some or all of the aforementioned exemplary embodiments may be described as shown in the following Supplementary Notes, the present invention is not limited to them.

(Supplementary Note 1)

A radio communication system in which a relay apparatus is connected between a base station and a base control station, wherein a location information request in which an identifier of the base station is set is transmitted to the relay apparatus, the location information request being sent by a location information control station.

(Supplementary Note 2)

A radio communication system in which a relay apparatus is connected between a base station and a base control station, wherein a location information request of the base station sent to the base control station by a location information control station is transmitted to the base station from the base control station without passing through the relay apparatus.

(Supplementary Note 3)

A radio communication system that is connected to a base station and a base control station and includes a relay apparatus between the base station and the base control station, wherein a location information request of the base station sent by a location information control station is transmitted to another management server without passing the base control station and the relay apparatus.

(Supplementary Note 4)

The radio communication system according to Supplementary Note 3, wherein the location information request is transmitted to the base station via the management server.

While the present invention has been described with reference to the exemplary embodiments, the present invention is not limited to the above exemplary embodiments. Various changes that can be understood by those skilled in the art can be made to the configurations and the details of the present invention within the scope of the present invention.

This application is based upon and claims the benefit of priority from Japanese Patent Application No. 2013-226184, filed on Oct. 31, 2013, the disclosure of which is incorporated herein in its entirety by reference.

REFERENCE SIGNS LIST

10 LOCATION INFORMATION CONTROL STATION
11 REQUEST GENERATION UNIT
12 REQUEST TRANSMISSION UNIT
20 BASE CONTROL STATION
21 REQUEST RECEPTION UNIT
22 REQUEST TRANSMISSION UNIT
30 RELAY APPARATUS
40 BASE STATION
N001 E-SMLC
N002 MME
N005 UE
N103 HeNB
N104 CELL
N106 GW
N0021 HeNB AND GW INFORMATION DATABASE
N0022 LOCATION-RELATED INFORMATION MESSAGE PROCESSING UNIT
N0023 LOCATION-RELATED INFORMATION MESSAGE FORWARD UNIT
N1061 HeNB INFORMATION DATABASE
N1062 LOCATION-RELATED INFORMATION MESSAGE PROCESSING UNIT
N1063 LOCATION-RELATED INFORMATION MESSAGE FORWARD UNIT
N901 E-SMLC
N902 MME
N903 eNB

N904 CELL
N905 UE

The invention claimed is:

1. A radio communication system comprising a relay apparatus connected between a base station and a base control station and a location information control station that manages location information of the base station, wherein:
the location information control station comprises:
a request generation unit that generates a location information request including regional information of a region for which the location information is requested; and
a request transmission unit that transmits the location information request that has been generated to the base control station, and
the base control station comprises:
a request reception unit that receives the location information request transmitted from the location information control station; and
a request transmission unit that transmits the location information request including the regional information in the location information request that has been received to the relay apparatus, wherein,
when there is a plurality of location information responses to be transmitted, sub-process numbers indicating that the plurality of location information responses are aggregated in one process are provided to process numbers included in the plurality of location information responses.

2. The radio communication system according to claim 1, wherein the request transmission unit of the base control station transmits the location information request to one or more base stations or the relay apparatus connected to the base station corresponding to the regional information.

3. The radio communication system according to claim 1, wherein the relay apparatus comprises:
a request reception unit that receives the location information request transmitted from the base control station; and
a request transmission unit that transmits the location information request to one or more base stations corresponding to the regional information in the location information request that has been received.

4. The radio communication system according to claim 2, wherein the base control station comprises:
a response reception unit that receives a location information response from one or more base stations or the relay apparatus connected to the base station; and
a response transmission unit that aggregates the location information responses that have been received and transmits the aggregated responses to the location information control station.

5. The radio communication system according to claim 3, wherein the relay apparatus comprises:
a response reception unit that receives a location information response from the one or more base stations; and
a response transmission unit that aggregates the location information responses that have been received and transmits the aggregated responses to the base control station.

6. A radio communication method in a radio communication system comprising a relay apparatus connected between a base station and a base control station and a location information control station that manages location information of the base station, wherein:
the location information control station generates a location information request including regional information of a region for which the location information is requested,
the location information control station transmits the location information request that has been generated to the base control station,
the base control station receives the location information request transmitted from the location information control station, and
the base control station transmits the location information request including the regional information in the location information request that has been received to the relay apparatus.

7. The radio communication method according to claim 6, wherein:
the relay apparatus receives the location information request transmitted from the base control station, and
the relay apparatus transmits the location information request to one or more base stations corresponding to the regional information in the location information request that has been received.

8. A base control station in a radio communication system comprising a relay apparatus connected between a base station and the base control station and a location information control station that manages location information of the base station, the base control station comprising:
a request reception unit that receives a location information request including regional information transmitted from the location information control station, wherein the location information request is generated by the location information control station; and
a request transmission unit that transmits the location information request including the regional information in the location information request that has been received to the relay apparatus.

9. A relay apparatus in a radio communication system comprising the relay apparatus connected between a base station and a base control station and a location information control station that manages location information of the base station, the relay apparatus comprising:
a request reception unit that receives a location information request including regional information transmitted from the base control station, wherein the location information request is generated by the location information control station; and
a request transmission unit that transmits a location information request to one or more base stations corresponding to the regional information in the location information request that has been received.

10. A radio communication system comprising a relay apparatus connected between a base station and a base control station and a location information control station that manages location information of the base station, wherein:
the location information control station comprises:
a request generation means for generating a location information request including regional information of a region for which the location information is requested; and
a request transmission means for transmitting the location information request that has been generated to the base control station, and
the base control station comprises:
a request reception means for receiving the location information request transmitted from the location information control station; and a request transmission means for transmitting the location information request including the regional information in the location information request that has been received to the relay apparatus.

11. A base control station in a radio communication system comprising a relay apparatus connected between a base station and the base control station and a location information control station that manages location information of the base station, the base control station comprising:

a request reception means for receiving a location information request including regional information transmitted from the location information control station, wherein the location information request is generated by the location information control station; and a request transmission means for transmitting the location information request including the regional information in the location information request that has been received to the relay apparatus.

12. A relay apparatus in a radio communication system comprising the relay apparatus connected between a base station and a base control station and a location information control station that manages location information of the base station, the relay apparatus comprising:

a request reception means for receiving a location information request including regional information transmitted from the base control station, wherein the location information request is generated by the location information control station; and a request transmission means for transmitting a location information request to one or more base stations corresponding to the regional information in the location information request that has been received.

* * * * *